(12) United States Patent
Lee et al.

(10) Patent No.: US 11,409,004 B2
(45) Date of Patent: Aug. 9, 2022

(54) METHOD OF DETECTING MULTIPATH STATE OF GLOBAL NAVIGATION SATELLITE SYSTEM SIGNAL AND ELECTRONIC DEVICE SUPPORTING THE SAME

(71) Applicant: Samsung Electronics Co., Ltd., Gyeonggi-do (KR)

(72) Inventors: Kihyuk Lee, Gyeonggi-do (KR); Jeongmin Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 193 days.

(21) Appl. No.: 16/665,712

(22) Filed: Oct. 28, 2019

(65) Prior Publication Data
US 2020/0132855 A1 Apr. 30, 2020

(30) Foreign Application Priority Data
Oct. 26, 2018 (KR) .................. 10-2018-0129379

(51) Int. Cl.
*G01S 19/22* (2010.01)
*G01S 19/32* (2010.01)
(Continued)

(52) U.S. Cl.
CPC ............... *G01S 19/22* (2013.01); *G01S 5/011* (2020.05); *G01S 19/32* (2013.01); *G01S 19/46* (2013.01)

(58) Field of Classification Search
CPC .......... G01S 19/22; G01S 19/32; G01S 19/46; G01S 5/011
See application file for complete search history.

(56) References Cited

U.S. PATENT DOCUMENTS

| 5,999,124 A | * | 12/1999 | Sheynblat ............... G01S 19/46 342/357.29 |
| 6,289,280 B1 | * | 9/2001 | Fernandez-Corbaton .................. G01S 19/22 340/988 |

(Continued)

FOREIGN PATENT DOCUMENTS

| KR | 1020150131020 | 11/2015 |
| KR | 1020160044244 | 4/2016 |
| KR | 20170099343 | 8/2017 |

OTHER PUBLICATIONS

S. Ollander, Multi-Frequency GNSS Signal Fusion for Minimization of Multipath and Non-Line-of-Sight Errors: A Survey, 2018 15th Workshop on Positioning, Navigation and Communications (WPNC), 6 pages, Oct. 2018 (Year: 2018).*

(Continued)

*Primary Examiner* — Bernarr E Gregory
*Assistant Examiner* — Fred H Mull
(74) *Attorney, Agent, or Firm* — The Farrell Law Firm, P.C.

(57) ABSTRACT

An electronic device includes a global navigation satellite system (GNSS) reception circuit configured to receive a first signal having a first frequency and a second signal having a second frequency; a wireless communication circuit configured to support cellular communication or short-range communication; a processor operably connected to the GNSS reception circuit and the wireless communication circuit; and a memory operably connected to the processor, wherein the memory stores instructions that enable the processor to perform operations when the instructions are executed, the operations including receiving the first signal using the GNSS reception circuit; receiving the second signal using the GNSS reception circuit; receiving at least one third signal using the wireless communication circuit; determin- (Continued)

ing existence of a multi-path state, based at least on the first signal and the second signal; and selecting at least one of the first signal, the second signal, or the third signal in order to determine a location of the electronic device, based at least on the determination.

8 Claims, 16 Drawing Sheets

(51) Int. Cl.
*G01S 19/46* (2010.01)
*G01S 5/00* (2006.01)

(56) References Cited

U.S. PATENT DOCUMENTS

| | | |
|---|---|---|
| 10,094,931 B2 | 10/2018 | Lennen |
| 10,203,397 B2 | 2/2019 | Sendonaris |
| 2002/0050944 A1* | 5/2002 | Sheynblat ............... G01S 19/30 342/357.25 |
| 2003/0072356 A1* | 4/2003 | Abraham ................ G01S 19/22 375/148 |
| 2006/0022869 A1* | 2/2006 | Zimmerman ........... G01S 19/32 342/458 |
| 2009/0141779 A1 | 6/2009 | Murakami |
| 2014/0159950 A1 | 6/2014 | Deshpande et al. |
| 2014/0232597 A1* | 8/2014 | Hyun ...................... G01S 19/30 342/357.69 |
| 2016/0146945 A1 | 5/2016 | Kamijo et al. |
| 2018/0011198 A1 | 1/2018 | Zalewski |
| 2018/0284287 A1 | 10/2018 | Kim et al. |

OTHER PUBLICATIONS

International Search Report dated Feb. 11, 2020 issued in counterpart application No. PCT/KR2019/014207, 8 pages.

* cited by examiner

METHOD OF DETECTING MULTIPATH STATE OF GLOBAL NAVIGATION SATELLITE SYSTEM SIGNAL AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2018-0129379, filed on Oct. 26, 2018, in the Korean Intellectual Property Office, the disclosure of which is incorporated by reference herein in its entirety.

BACKGROUND

1. Field

The disclosure relates generally to a method of detecting the multi-path state of a global navigation satellite system (GNSS) signal, and an electronic device supporting the same.

2. Description of Related Art

An electronic device may measure its location using a GNSS signal received from a satellite. For example, the electronic device may obtain GNSS signals from four or more satellites. The electronic device may determine the pseudo range between the electronic device and each of the four or more satellites, based on the obtained GNSS signals. The electronic device may measure the location of the electronic device, based on the pseudo ranges.

The electronic device may provide various functions related to the location by providing information associated with the measured location of the electronic device to a location-related application, such as a navigation application, a map application, or a web application.

An electronic device measures the location of the electronic device using only a GNSS signal, for example, a global positioning system (GPS) having the L1 frequency band (a frequency band ranging from 1560 megahertz (MHz) to 1590 MHz).

If the electronic device measures the location of the electronic device using only a GPS signal having the L1 frequency band in a place where buildings or structures are concentrated, a GPS signal may be received after being reflected or refracted by buildings or structures, and thus, the location of the electronic device may be inaccurately measured.

SUMMARY

The present disclosure has been made to address the above-mentioned problems and disadvantages, and to provide at least the advantages described below.

In accordance with an aspect of the disclosure, an electronic device includes a GNSS reception circuit configured to receive a first signal having a first frequency and a second signal having a second frequency; a wireless communication circuit configured to support cellular communication or short-range communication; a processor operably connected to the GNSS reception circuit and the wireless communication circuit; and a memory operably connected to the processor, wherein the memory stores instructions that enable the processor to perform operations when the instructions are executed, the operations including receiving the first signal using the GNSS reception circuit; receiving the second signal using the GNSS reception circuit; receiving at least one third signal using the wireless communication circuit; determining existence of a multi-path state, based at least on the first signal and the second signal; and selecting at least one of the first signal, the second signal, or the third signal in order to determine the location of the electronic device, based at least on the determination.

In accordance with another aspect of the disclosure, a method includes receiving a first signal using a GNSS reception circuit configured to receive the first signal having a first frequency and a second signal having a second frequency; receiving the second signal using the GNSS reception circuit; receiving at least one third signal using a wireless communication circuit configured to support cellular communication or short-range communication; determining existence of a multi-path state, based at least on the first signal and the second signal; and selecting at least one of the first signal, the second signal, or the third signal in order to determine the location of the electronic device, based at least on the determination.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
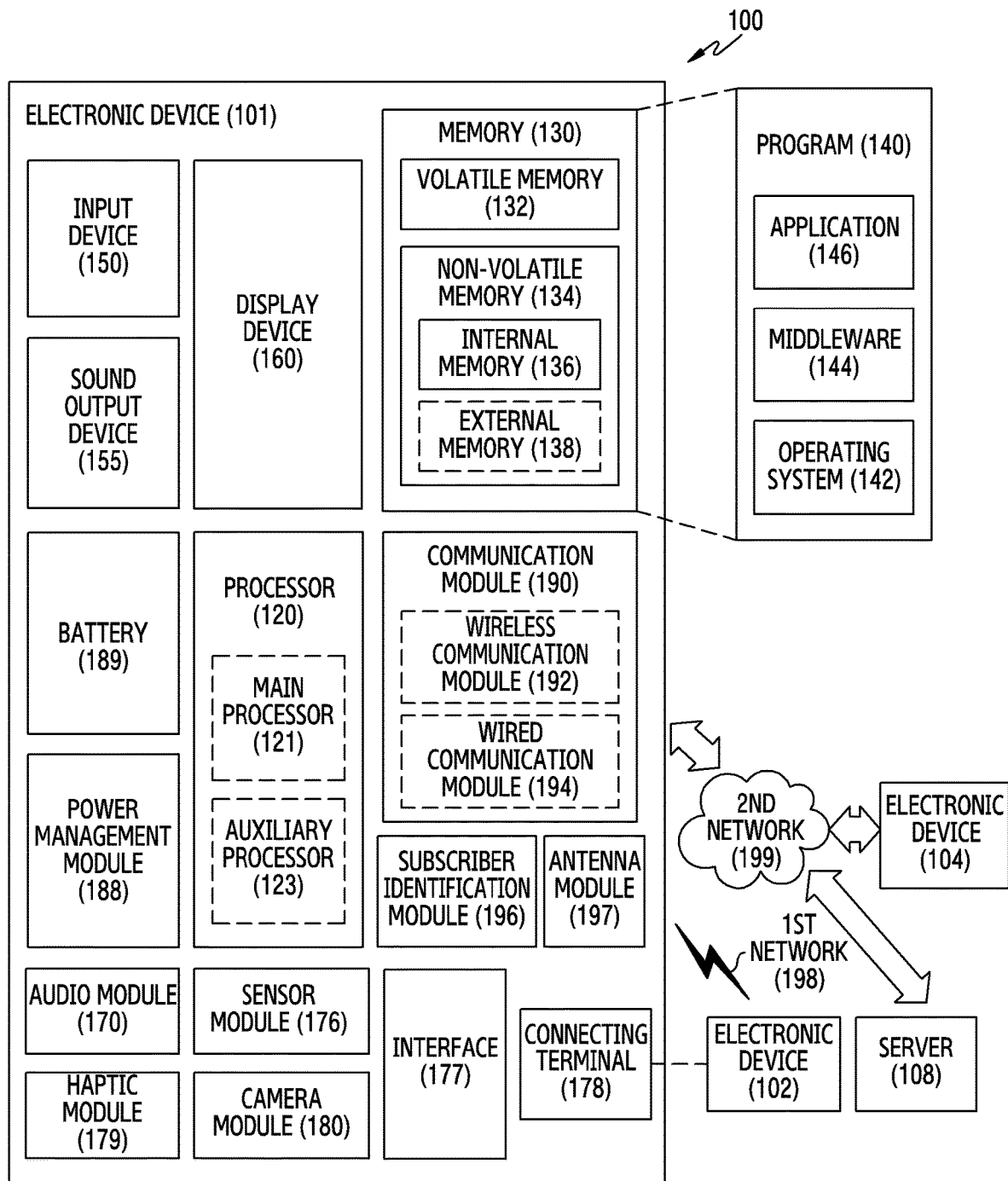
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments, provided is a method of detecting the multi-path state of a GNSS signal and an electronic device supporting the same, the method may accurately detect the multi-path state of a GNSS signal using a plurality of GNSS signals having different frequency bands.

The method may detect the multi-path state of a GNSS signal, thereby accurately measuring the location of the electronic device.

Also, the location of the electronic device may be measured based on GNSS signals received from satellites that transmit, to the electronic device, GNSS signals excluding a multi-path signal from among a plurality of satellites. Thus, the location of the electronic device can be more accurately measured.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, and firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
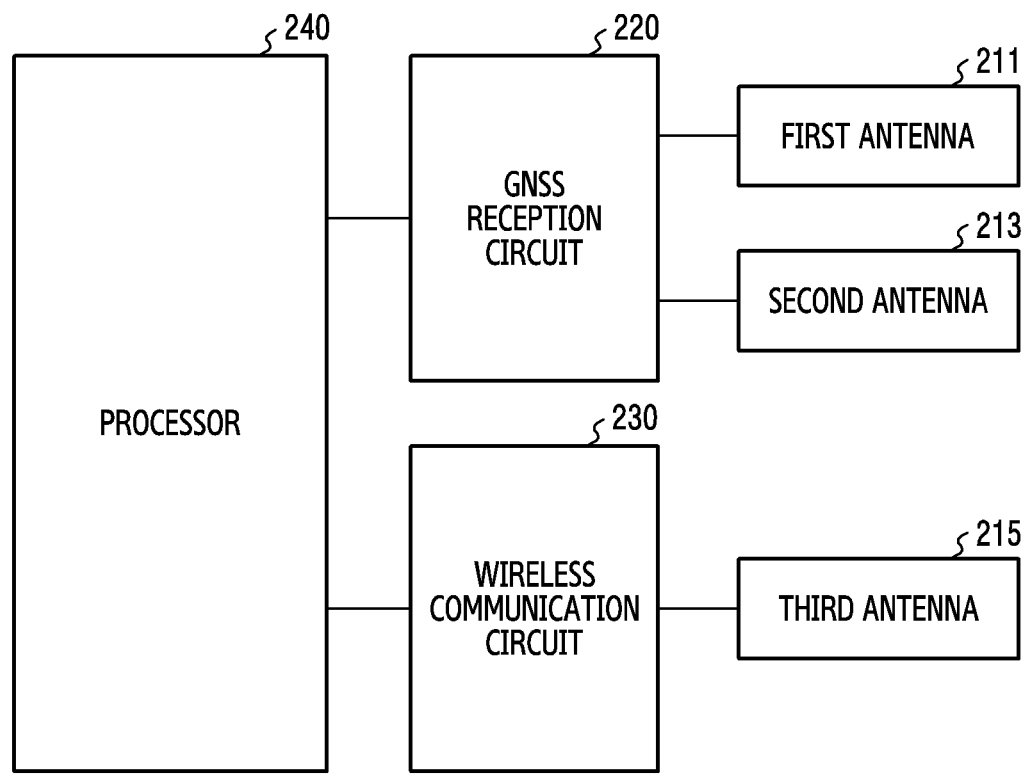
FIG. 2 is a diagram of an electronic device that detects the multi-path state of a GNSS signal, according to an embodiment.

FIG. 2 is a diagram of an electronic device 101 that detects the multi-path state of a GNSS signal, according to an embodiment.

Referring to FIG. 2, the electronic device 101 includes a first antenna 211, a second antenna 213, a third antenna 215, a GNSS reception circuit 220, a wireless communication circuit 230, and a processor 240.

The first antenna 211 and the second antenna 213 may receive a GNSS signal from a satellite (or GNSS device).

The first antenna 211 and the second antenna 213 may receive GNSS signals having different frequency bands (e.g., an upper frequency band and a lower frequency band) from the same (or a single) satellite. For example, the first antenna 211 may be an antenna for receiving a GPS signal using an L1 frequency band from a first satellite (or the first antenna 211 may be a dedicated antenna for reception in the L1 frequency band). The second antenna 213 may be an antenna for receiving a GPS signal using an L5 frequency band (a frequency band ranging from 1164 MHz to 1188 MHz) from the first satellite (or the second antenna 213 may be a dedicated antenna for reception in the L5 frequency band).

The first antenna 211 may be an antenna for receiving a Beidou signal using a B1 frequency band (a frequency band ranging from 1559 MHz to 1563 MHz) from a second satellite. The second antenna 213 may be an antenna for receiving a Beidou signal using a B2 frequency band (a frequency band ranging from 1195 MHz to 1219 MHz) from the second satellite.

The first antenna 211 may be an antenna for receiving a Galileo signal using an E1 frequency band (a frequency band ranging from 1558 MHz to 1592 MHz) from a third satellite. The second antenna 213 may be an antenna for receiving a Galileo signal using an E5 frequency band (a frequency band ranging from 1166 MHz to 1217 MHz) from the third satellite.

The first antenna 211 and the second antenna 213 may be antennas for receiving various GNSS signals from the same satellite, in addition to the above-described GNSS signals. For example, the first antenna 211 and the second antenna 213 may be antennas for receiving different frequency bands of a globalnaya navigazionnaya sputnikovaya sistema or GNSS (GLONASS) signal or a quasi-zenith satellite system (QZSS) signal received from the same satellite.

Hereinafter, for ease of description, descriptions will be provided under the assumption that the first antenna 211 is an antenna for receiving a GPS signal using the L1 frequency band, and the second antenna 213 is an antenna for receiving a GPS signal using the L5 frequency band.

Also, hereinafter, a GPS signal using the L1 frequency band is referred to as a "first signal", and a GPS signal using the L5 frequency band is referred to as a "second signal".

Each of the first signal and the second signal may include a pseudo random noise (PRN) code, a navigation message (or navigation message data), and a carrier. The PRN code and navigation message may be carried by a carrier (or superposed on a carrier) and may be transmitted from a satellite to the electronic device 101. The PRN code may be information unique to a satellite (or may include information unique to a satellite). The PRN code may include a coarse acquisition (C/A) code (or a C/A code may include a PRN code). The C/A code may include consecutive chips. The length of the C/A code of the first signal may be 1023 bits, and the length of the C/A code of the second signal may be 10230 bits. The chip rate (or code rate) of the first signal may be 1.023 MHz, and the chip rate of the second signal may be 10.23 MHz which is ten times faster than the chip rate of the first signal.

The navigation message may include ephemeris information, almanac information, space vehicle (SV) clock data, SV health/accuracy information, ionospheric model information, and universal time coordinated (UTC) information. However, the information including the navigation message is not limited thereto.

Each of the first signal and the second signal may include an original signal and a reflected signal. The original signal may be a signal that is directly transmitted from a satellite to the electronic device 101, without being reflected from a building or structure. The original signal may be referred to as a direct path signal. The reflected signal may be a signal transmitted to the electronic device 101 after being reflected by a building or structure (or via a multi-path). The reflected signal may be referred as a multi-path signal.

Hereinafter, the original signal of the first signal is referred to as a "first original signal" and the reflected signal of the first signal is referred to as a "first reflected signal". Also, the original signal of the second signal is referred to as a "second original signal" and the reflected signal of the second signal is referred to as a "second reflected signal".

The third antenna 215 may be an antenna for supporting cellular communication and/or short-range communication. The third antenna 215 may be the first antenna 211 or the second antenna 213. For example, the third antenna 215 may receive a signal for cellular communication and/or short-range communication, or may receive at least one of the first signal or the second signal.

The first antenna 211, the second antenna 213, and the third antenna 215 may be included in the antenna module 197 of FIG. 1.

The GNSS reception circuit 220 may receive the first signal and the second signal from each of the first antenna 211 and the second antenna 213. The GNSS reception circuit 220 may convert the first signal and the second signal in analog form into the first signal and the second signal in digital form.

Although FIG. 2 illustrates that the GNSS reception circuit 220 is implemented independently from the processor 240, the GNSS reception circuit 220 may be included in the processor 240.

The electronic device 101 may further include a radio frequency (RF) front module which is disposed between the GNSS reception circuit 220 and each of the first antenna 211 and the second antenna 213. The RF front module may include a GNSS surface acoustic wave filter and a GNSS low-noise amplifier.

The wireless communication circuit 230 may be configured to perform cellular communication and/or short-range communication with an external electronic device.

The GNSS reception circuit 220 and the wireless communication circuit 230 may be included in the communication module 190.

The processor 240 may perform an operation of detecting the multi-path state of a GNSS signal.

The processor 240 may receive the first signal and the second signal in the digital form from the GNSS reception circuit 220.

The processor 240 may perform a code synchronization (or synchronization) operation (or a code tracking operation). The processor 240 may generate a replica code which is identical to the C/A code of each of the first signal and the second signal. The processor 240 may synchronize the C/A code and the replica signal with respect to each of the first signal and the second signal, using a correlator. The correlator may include an early-prompt-later (EPL) correlator using a prompt (P) code, an early (E) code, and a late (L) code. However, the correlator for synchronizing the C/A code and the replica code for each of the first signal and the second signal is not limited to the EPL correlator. The processor 240 may perform code synchronization, so as to obtain (or calculate) a code delay (or a code delay value). The code delay may correspond to a time used for obtaining a pseudo range between a satellite and the electronic device 101 (e.g., the GNSS reception circuit 220).

The processor 240 may perform synchronization of the C/A code and replica code with respect to each of the first signal and the second signal, and may obtain (or calculate) the vector of the first signal (e.g., the first original signal, the first reflected signal, or the correlated vector of the first signal) (hereinafter, a "first signal vector") and the vector of the second signal (e.g., the second original signal and the second reflected signal, or the correlated vector of the second signal) (hereinafter, a "second signal vector). The first signal vector may indicate the size (or intensity) of the first signal obtained in the state in which the C/A code and the replica code of the first signal (or the replica code of the C/A code of the first signal) are synchronized (or after synchronization of them). The first signal vector may correspond to a correlation value obtained in the state in which the C/A code and the replica code of the first signal are synchronized. The second signal vector may indicate the size (or intensity) of the second signal obtained in the state in which the C/A code and the replica code of the second signal (or the replica code of the C/A code of the second signal) are synchronized. The second signal vector may correspond to a correlation value obtained in the state in which the C/A code and the replica code of the second signal are synchronized.

The processor 240 may detect the multi-path state of a GNSS signal (or the first signal and the second signal), based at least on the first signal vector or the second signal vector (or the distribution of the first signal vector or the second signal vector).

The processor 240 may detect the multi-path state of a GNSS signal, based at least on the waveform of the first signal vector and the waveform of the second signal vector.

Figure 3:
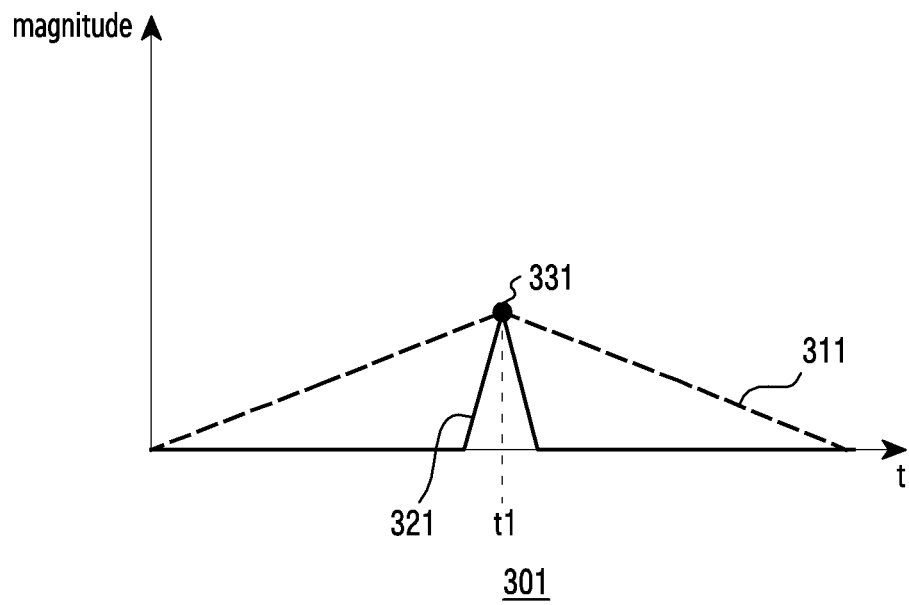
FIG. 3 is a diagram illustrating a method of detecting the multi-path state of a GNSS signal, based on the waveform of a first signal vector and the waveform of a second signal vector, according to an embodiment.
Figure 3:
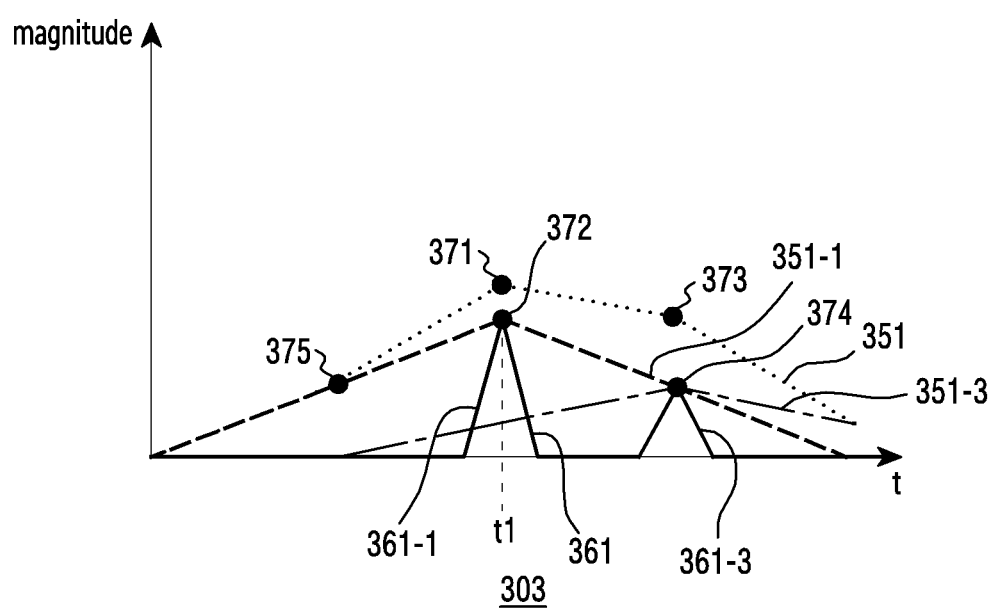

FIG. 3 is a diagram illustrating a method of detecting the multi-path state of a GNSS signal, based on the waveform of a first signal vector and the waveform of a second signal vector, according to an embodiment.

Referring to FIG. 3, a graph 301 may show a first signal vector 311 obtained (i.e., calculated or extracted) when a first signal includes only a first original signal excluding a first reflected signal, and a second signal vector 321 obtained when a second signal includes only a second original signal excluding a second reflected signal. The chip rate of the first signal is lower than the chip rate of the second signal. Accordingly, as shown in the graph 301, the time range during which the first signal vector 311 is obtained may be wider than the time range during which the second signal vector 321 is obtained.

As shown in the graph 301, if it is identified that each of the first signal vector 311 and the second signal vector 321 include a peak point 331, the processor 240 may determine that the first signal and the second signal include only a first original signal and a second original signal, respectively.

If it is determined that the first signal and the second signal include only the first original signal and the second original signal, respectively, the processor 240 may determine that a GNSS signal is not in the multi-path state.

A graph 303 shows a first signal vector 351 obtained when a first signal includes a first original signal and a first reflected signal, and a second signal vector 361 obtained when a second signal includes a second original signal and a second reflected signal.

In the graph 303, the first signal vector 351 may be a vector obtained by combining (or summing) a first original signal vector 351-1 and a first reflected signal vector 351-3. As illustrated in the graph 303, the first original signal vector 351-1 and the first reflected signal vector 351-3 overlap in a part of a time interval, and the slope of the first signal vector 351 may change at a point 375 and a point 373. For example, the slope of the first signal vector 351 may increase at the point 375, and may decrease at the point 373 over time (t). The magnitude of a vector at the peak point 371 may be larger than the magnitude of a vector at the peak point 331 in the graph 301. The waveform of the first signal vector 351 may be a waveform in the form of a circle centered on the peak point 371.

In the graph 303, the second signal vector 361 may be a vector obtained by combining a second original signal vector 361-1 and a second reflected signal vector 361-3. As shown in the graph 303, the second original signal vector 361-1 and the second reflected signal vector 361-3 do not overlap, and thus, the peak point 372 of the second original signal vector 361-1 and the peak point 374 of the second reflected signal vector 361-3 may be distinguished (or identified). The waveform of the second signal vector 361 may be a waveform in the form including the peak point 372 and the peak point 374 distinct from the peak point 372.

As shown in the graph 303, if it is identified that the first signal vector 351 includes at least one point (e.g., the point 375 and the point 373) at which the slope changes, and the second signal vector 361 includes a plurality of different peak points (e.g., the peak point 372 and the peak point 374), the processor 240 may determine that the first signal and the second signal include the first reflected signal and the second reflected signal in addition to the first original signal and the second original signal.

If it is identified that the second signal vector 361 includes the peak point 372 and the peak point 374, the processor 240 may determine whether the first signal vector 351 includes at least one point (e.g., the point 375 and the point 373) at which the slope changes. For example, if it is identified that the second signal vector 361 includes the peak point 372 and the peak point 374, the processor 240 may determine whether the first signal vector 351 includes at least one point at which the slope changes.

As shown in the graph 303, if it is identified that the waveform of the first signal vector 351 is a waveform in the form of a circle centered on a single point 371, and the second signal vector 361 includes a plurality of different points (e.g., the peak point 372 and the peak point 374), the processor 240 may determine that the first signal and the second signal include the first reflected signal and the second reflected signal in addition to the first original signal and the second original signal.

If it is determined that the first signal and the second signal include the first reflected signal and the second reflected signal in addition to the first original signal and the second original signal, the processor 240 may determine that a GNSS signal is in the multi-path state.

Although FIG. 3 illustrates that each of the first signal and the second signal includes a single reflected signal (or reflected signal vector), the disclosure is not limited thereto. For example, the method illustrated in FIG. 3 may be applied equally or similarly to the case in which each of the first signal and the second signal includes a plurality of reflected signals.

The processor 240 may detect the multi-path state of a GNSS signal, based on the waveform of a second signal vector.

Figure 4:
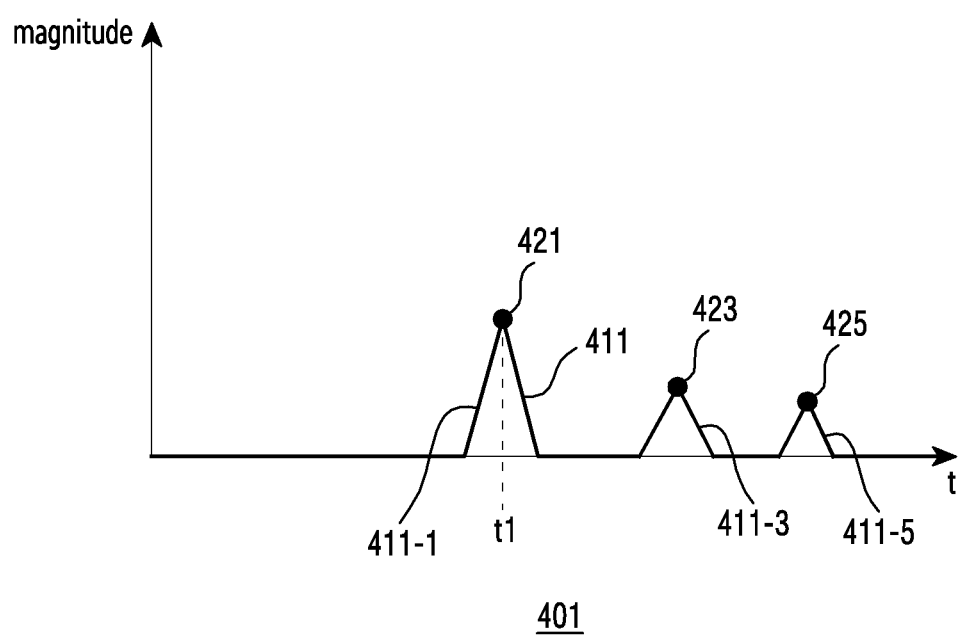
FIG. 4 is a diagram illustrating a method of detecting the multi-path state of a GNSS signal, based on the waveform of a second signal vector, according to an embodiment.

FIG. 4 is a diagram illustrating a method of detecting the multi-path state of a GNSS signal, based on the waveform of a second signal vector, according to an embodiment.

Referring to FIG. 4, a graph 401 shows a second signal vector 411 including a second original signal vector 411-1 and second reflected signal vectors 411-3 and 411-5. The peak points 421, 423, and 425 may indicate points at which the vector values of the second original signal vector 411-1, the second reflected signal vector 411-3, and the second reflected signal vector 411-5 are maximum values, respectively.

If it is identified that the second signal vector further includes at least one peak point (e.g., peak points 423 and 425) in addition to the peak point 421 of the second original signal vector within a predetermined period of time, the processor 240 may determine that the second signal includes a reflected signal.

If it is determined that the second signal includes a reflected signal, the processor 240 may determine that a GNSS signal is in the multi-path state.

The processor 240 may determine the number of second reflected signals, depending on the number of peak points that the second signal vector includes in addition to the peak point 421 of the second original signal vector within a predetermined period of time. For example, if it is identified that the second signal vector further includes two peak points 423 and 425 in addition to the peak point 421 of the second original signal vector within a predetermined period of time, the processor 240 may determine that the second signal includes two second reflected signals.

If the number of peak points that the second signal vector includes in addition to the peak point of the second original signal vector during a predetermined period of time is greater than or equal to a predetermined number, the processor 240 may determine that a GNSS signal is in the multi-path state.

As the second signal vector includes a larger number of peak points in addition to the peak point of the second original signal vector during a predetermined period of time, the degree of the multi-path state of a GNSS signal is determined by the processor 240 to be higher.

The processor 240 may detect the multi-path state of a GNSS signal, based on the difference in reception time between an original signal and a reflected signal.

Figure 5:
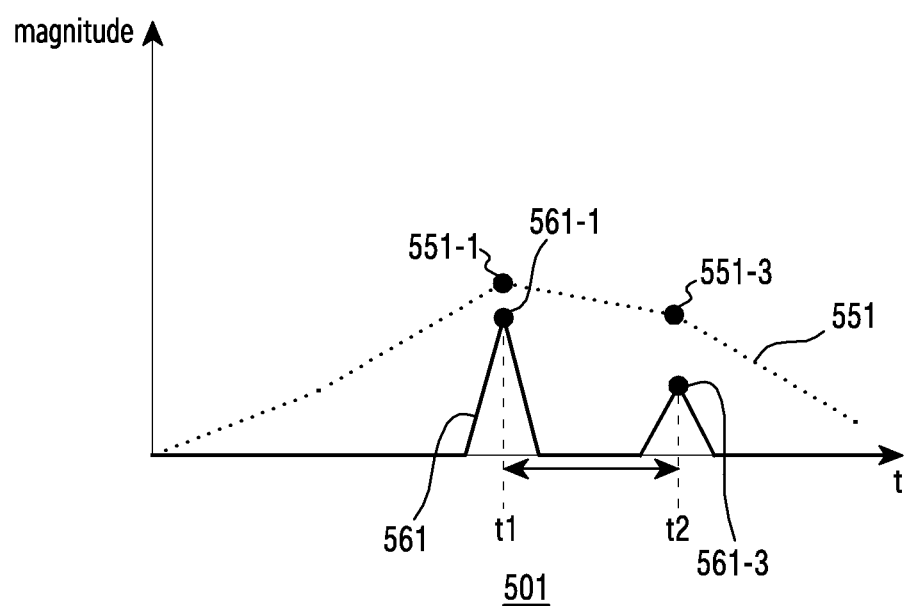
FIG. 5 is a diagram illustrating a method of detecting the multi-path state of a GNSS signal, based on the difference in reception time between an original signal and a reflected signal, according to an embodiment.

FIG. 5 is a diagram illustrating a method of detecting the multi-path state of a GNSS signal, based on the difference in reception time between an original signal and a reflected signal, according to an embodiment.

Referring to FIG. 5, a graph 501 shows a first signal vector 551 including a first original signal vector and a first reflected signal vector and a second signal vector 561 including a second original signal vector and a second reflected signal vector.

The processor 240 may obtain (or calculate) the difference between time t2 corresponding to a peak point 561-3 of the second reflected signal vector and time t1 corresponding to a peak point 561-1 of the second original signal vector. The difference between time t2 and time t1 may correspond to the difference between a time at which the electronic device 101 receives the second reflected signal and a time at which the second original signal is received.

As the difference between time t2 and time t1 becomes longer, the path (or distance) via which the second reflected signal transmitted from a satellite to the electronic device 101 becomes farther.

Although FIG. 5 illustrates a method of obtaining the difference in reception time between the second original signal and the second reflected signal, the disclosure is not limited thereto. For example, the processor 240 may obtain the difference between time t2 corresponding to a point 551-3 at which the slope of the first signal vector 551 is changed and time t1 corresponding to a peak point 551-1 of the first signal vector 551.

The processor 240 may determine that a GNSS signal is in the multi-path state, if it is determined that the difference in reception time between an original signal and a reflected signal is less than or equal to a predetermined period of time.

The processor 240 may determine that a GNSS signal is not in the multi-path state, if it is determined that the difference in reception time between an original signal and a reflected signal is longer than a predetermined period of time.

As the difference in reception time between an original signal and a reflected signal becomes shorter, the degree of the multi-path state of a GNSS signal becomes higher.

The processor 240 may detect the multi-path state of a GNSS signal, based on the waveform of a first signal vector.

Figure 6:
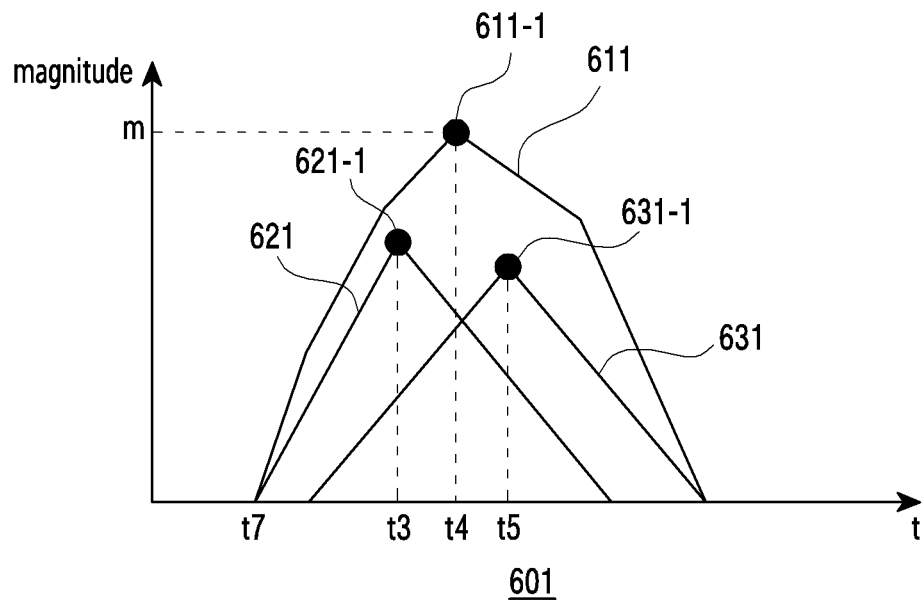
FIG. 6 is a diagram illustrating a method of detecting the multi-path state of a GNSS signal, based on the waveform of a first signal vector, according to an embodiment.
Figure 6:
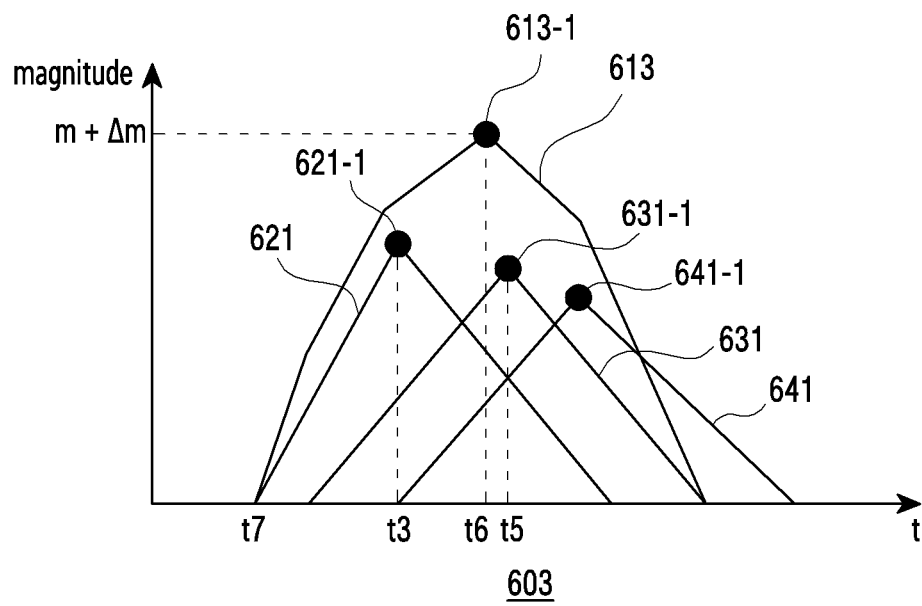

FIG. 6 is a diagram illustrating a method of detecting the multi-path state of a GNSS signal, based on the waveform of a first signal vector, according to an embodiment.

Referring to FIG. 6, a graph 601 shows a first signal vector 611 obtained by combining a first original signal vector 621 and a single first reflected signal vector 631. If the first original signal vector 621 including (or having) a peak point 621-1 overlaps the first reflected signal vector 631 including a peak point 631-1, the first signal vector 611 may include a peak point 611-1 at time t4 which is between time t5 corresponding to the peak point 631-1 and time t3 corresponding to the peak point 621-1. The magnitude of the peak point 611-1 of the first signal vector 611 may be m.

A graph 603 shows a first signal vector 613 obtained by combining the first original signal vector 621 and a plurality of first reflected signal vectors 631 and 641. If the first original signal vector 621 including a peak point 621-1, the first reflected signal vector 631 including a peak point 631-1, and the first reflected signal vector 641 including a peak point 641-1 overlap, the first signal vector 613 may include a peak point 613-1 at time t6 which is later than t4. As illustrated in the graph 603, as the first original signal vector 621, the first reflected signal vector 631, and the first reflected signal vector 641 overlap in parts, the magnitude of a peak point 613-1 of the first signal vector 613 may be m+Δm, which is Δm different from (or greater or less than) the magnitude (m) of a peak point 611-1 of the first signal vector 611.

As illustrated in the graph 601 and the graph 603, as a larger number of first reflected signal vectors overlap a first original signal vector, the difference between a time corresponding to the peak point of a first signal vector and a time corresponding to the peak point of the first original signal vector (or the difference between a time corresponding to the peak point of a first signal vector and time t7 at which obtaining the first original signal vector starts) becomes longer.

As the difference between a time corresponding to the peak point of a first signal vector and a time corresponding to the peak point of a first original signal vector becomes longer, a first signal includes a larger number of reflected signals.

If the difference between a time corresponding to the peak point of a first signal vector and a time corresponding to the peak point of a first original signal vector is becomes longer, this indicates that the electronic device 101 has been moved to a place where buildings or structures are concentrated compared to a previous location.

If the difference between a time corresponding to the peak point of a first signal vector and a time corresponding to the peak point of a first original signal vector is greater than or equal to a predetermined period of time, the processor 240 may determine that a GNSS signal is in the multi-path state.

As the difference between a time corresponding to the peak point of a first signal vector and a time corresponding to the peak point of a first original signal vector becomes longer, the degree of the multi-path state of a GNSS signal is determined by the processor 240 to be higher.

The processor 240 may combine methods of detecting the multi-path state of a GNSS signal, which has been described in FIGS. 3-6, so as to determine whether a GNSS signal is in the multi-path state or to determine information associated with a multi-path state.

Referring again to FIG. 2, the processor 240 may determine the degree of the multi-path state of a GNSS signal based on the altitude of a satellite that transmits the GNSS signal. The processor 240 may determine the altitude (or the angle of altitude, azimuth or elevation angle) of a satellite (or the angle between the line connecting the location of the electronic device 101 to the surface and the line connecting the location of the electronic device 101 and a satellite) based on ephemeris information included in a navigation message.

As the altitude of a satellite becomes lower, the likelihood of an error that occurs in determination of the multi-path state of a GNSS signal becomes higher. If the altitude of a satellite is low, the processor 240 may provide (or apply) a low weight to the determined degree of the multi-path state of a GNSS signal. If the altitude of a satellite is higher, the processor 240 may provide a higher weight to the determined degree of the multi-path state of a GNSS signal. The processor 240 may determine (or re-determine) the degree of the multi-path state of a GNSS signal, based at least on the determined degree of the multi-path state of a GNSS signal and a weight applied to a satellite (or by multiplying the determined degree of the multi-path state of a GNSS signal and a weight applied to a satellite).

The processor 240 may determine an environment (hereinafter, "reception environment") where a GNSS signal is received, based at least on the multi-path state of a GNSS signal. If it is determined that a GNSS signal is not in the multi-path state (or if it is determined that a GNSS signal includes only an original signal excluding a reflected signal), the processor 240 determines that a reception environment is an open sky (rural) environment. If it is determined that a GNSS signal is in the multi-path state (or if it is determined that a GNSS signal includes an original signal and a reflected signal), the processor 240 determines that a reception environment is a civil (or urban) environment. If it is determined that a GNSS signal includes only a reflected signal excluding an original signal, the processor 240 may determine that a reception environment is a canyon (or deep urban) environment. The processor 240 may determine that a reception environment is a civil environment or a canyon environment depending on the degree of the multi-path state of a GNSS signal. For example, if the degree of the multi-path state of a GNSS signal is greater than or equal to a predetermined degree, the processor 240 may determine a reception environment to be a canyon environment. If the degree of the multi-path state of a GNSS signal is less than the predetermined degree, the processor 240 may determine the reception environment to be a civil environment.

The density of buildings or structures around the electronic device 101 may increase in order of an open sky environment, a civil environment, and a canyon environment.

The processor 240 may determine a reception environment, based at least on a plurality of GNSS signals received from a plurality of satellites.

The processor 240 may determine a multi-path state for each of a plurality of GNSS signals received from a plurality of satellites.

If it is determined that the number of satellites that transmit GNSS signals is less than or equal to a predetermined number (e.g., 8), the processor 240 may determine that a reception environment is a canyon environment. If it is determined that the number of satellites that transmit GNSS signals is less than or equal to a predetermined number (e.g., 4), the processor 240 may determine that a reception environment is an environment where the measurement of a location is not allowed.

If it is determined that the number of satellites that transmit GNSS signals is greater than or equal to a predetermined number (e.g., approximately 10), and the number of satellites that transmit GNSS signals identified as being in the multi-path state is greater than or equal to a predetermined number (e.g., approximately 5), the processor 240 may determine that a reception environment is a civil environment.

The processor 240 may determine a reception environment based at least on the altitude of a satellite. According to an embodiment, the processor 240 may determine the altitude of a satellite that transmits a GNSS signal. The processor 240 may determine a reception environment based at least on a GNSS signal transmitted by a satellite of which the altitude is greater than a predetermined altitude, excluding a GNSS signal transmitted by a satellite of which the altitude is less than the predetermined altitude.

The processor 240 may determine whether a reception environment is a canyon environment, based at least on a relative change of the vectors of a plurality of GNSS signals received from a plurality of satellites.

Figure 7:
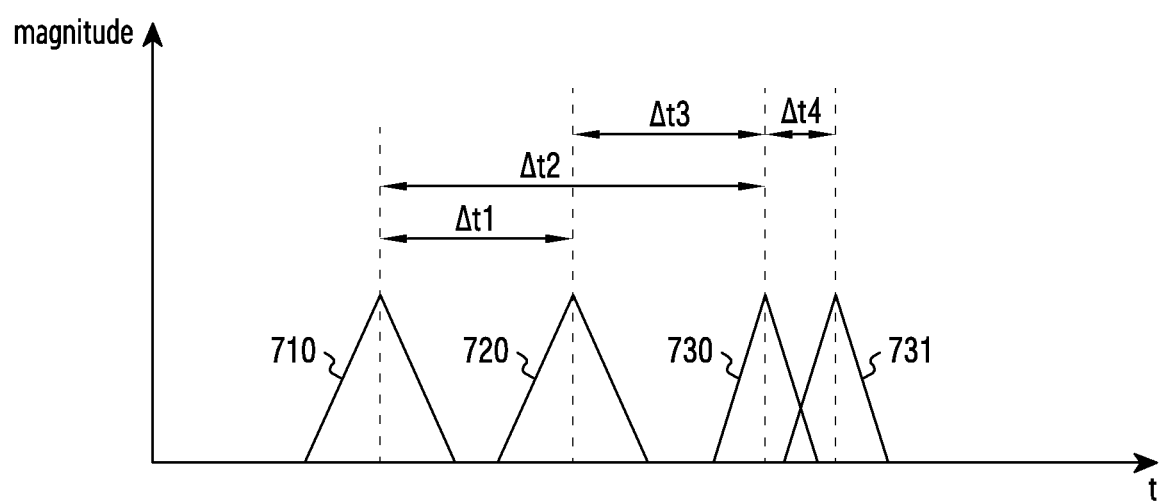
FIG. 7 is a diagram illustrating a method of determining whether a reception environment is a canyon environment, based at least on a relative change of the vectors of a plurality of GNSS signals received from a plurality of satellites, according to an embodiment.

FIG. 7 is a diagram illustrating a method of determining whether a reception environment is a canyon environment, based at least on a relative change of the vectors of a plurality of GNSS signals received from a plurality of satellites, according to an embodiment.

Referring to FIG. 7, a GNSS signal vector 710 is a vector based on a GNSS signal received from a first satellite, a GNSS signal vector 720 is a vector based on a GNSS signal received from a second satellite, and a GNSS signal vector 730 is a vector based on a GNSS signal received from a third satellite.

If the reception environment of the electronic device 101 is an open sky environment or a civil environment and a satellite or the electronic device 101 is moving, the degree of the multi-path state of each GNSS signal may be changed. If the reception environment of the electronic device 101 is an open sky environment or a civil environment, and the satellite or the electronic device 101 is moving, the time interval ($\Delta t1$) between the GNSS signal vector 710 and the GNSS signal vector 720 (or the time interval between the peak point of the GNSS signal vector 710 and the peak point of the GNSS signal vector 720), the time interval ($\Delta t2$) between the GNSS signal vector 710 and the GNSS signal vector 730, and the time interval ($\Delta t3$) between the GNSS signal vector 720 and the GNSS signal vector 730 may be maintained to be constant.

If the reception environment of the electronic device 101 is changed from the open sky environment or civil environment to the canyon environment, the degree of the multi-path state of each GNSS signal is changed, and some of a plurality of satellites may transmit a GNSS signal including only a reflected signal excluding an original signal. The time interval between the vector of a GNSS signal transmitted by a satellite that transmits a GNSS signal including only a reflected signal excluding an original signal and the GNSS signal vector of a GNSS signal transmitted by another satellite (a satellite that transmits a GNSS signal including an original signal, or a satellite that transmits a GNSS signal including an original signal and a reflected signal) may be changed. For example, as illustrated in FIG. 7, if a third satellite, which has transmitted a GNSS signal including an original signal and a reflected signal, transmits a GNSS signal including only a reflected signal excluding an original signal, the vector of the GNSS signal transmitted by the third satellite may be changed from the GNSS signal vector 730 to a GNSS signal vector 731. If the vector of the GNSS signal transmitted by the third satellite is changed from the GNSS signal vector 730 to the GNSS signal vector 731, time intervals $\Delta t2$ and $\Delta t3$ between vectors may be further changed by a time interval ($\Delta t4$).

If the degree of the multi-path state of each of a plurality of GNSS signals changes and the time interval between GNSS signal vectors corresponding to a plurality of GNSS signals transmitted from different satellites is changed, the processor 240 may determine that the reception environment is a canyon environment (or may determine that the reception environment is changed from the open sky environment or civil environment to the canyon environment).

If the degree of the multi-path state of each of a plurality of GNSS signals changes, and the time interval between GNSS signal vectors corresponding to a plurality of GNSS signals transmitted from different satellites is maintained, the processor 240 may determine that the reception environment is an open sky environment or a civil environment (or may determine that the open sky environment or civil environment are maintained).

Referring again to FIG. 2, the processor 240 may determine priorities of a plurality of satellites, based at least on the multi-path state of each of a plurality of GNSS signals received from a plurality of satellites. For example, the processor 240 may provide a high priority to a satellite that transmits a GNSS signal identified as not being in the multi-path state among a plurality of satellites, and may provide a low priority to a satellite that transmits a GNSS signal identified as being in the multi-path state.

The processor 240 may assign a priority to a satellite according to the degree of the multi-path state of a GNSS signal transmitted by each of a plurality of satellites. For example, the processor 240 may assign the highest priority to a satellite that transmits a GNSS signal with the lowest degree of the multi-path state of a GNSS signal relative to other satellites. The processor 240 may determine the location of the electronic device 101, based at least on GNSS signals transmitted by a predetermined number of satellites, according to a satellite having the highest priority. For example, the location of the electronic device 101 may be determined based at least on GNSS signals transmitted by five satellites having the highest priorities among ten satellites.

The processor 240 may determine (or measure) the location of the electronic device 101, based at least on the multi-path state of a GNSS signal (or a first signal and a second signal).

The processor 240 may select at least one of the first signal or the second signal in order to determine the location of the electronic device 101, based at least on the multi-path state of a GNSS signal. For example, if it is determined that a GNSS signal is not in the multi-path state, the processor 240 may select the first signal as a signal for determining the location of the electronic device 101. Additionally or alternatively, if it is determined that a GNSS signal is in the multi-path state, the processor 240 may select the first signal and the second signal as signals for determining the location of the electronic device 101.

The processor 240 may select at least one of the first signal or the second signal in order to determine the location of the electronic device 101, based at least on a reception environment. For example, if it is determined that the reception environment is an open sky environment, the processor 240 may select the first signal as a signal for determining the location of the electronic device 101. Additionally or alternatively, if it is determined that the reception environment is a civil environment or a canyon environment, the processor 240 may select the first signal and the second signal as signals for determining the location of the electronic device 101.

If the location of the electronic device 101 is determined using the first signal and the second signal, the location of the electronic device 101 may be more accurately determined than the case of using only the first signal to determine the location of the electronic device 101, but may consume a larger amount of power.

The processor 240 may determine the location of the electronic device 101 using at least one of the selected first signal or second signal, and/or the processor 240 may determine the location of the electronic device 101 based at least on a pseudo range based on a code delay obtained via a code synchronization operation, ephemeris information included in a navigation message, and correction information (e.g., an ionosphere delay error, a troposphere delay error, and an astronomical calendar and satellite clock error), using at least one of the selected first signal or second signal.

The processor 240 may not use at least one GNSS signal to determine the location of the electronic device 101 (or may exclude some of a plurality of satellites), based at least on the multi-path state of each of a plurality of GNSS signals received from a plurality of satellites. For example, the processor 240 may determine the location of the electronic device 101 based on a GNSS signal identified as not being in the multi-path state or a GNSS signal of which the degree of the multi-path state is less than a predetermined degree, excluding (excepting) a GNSS signal identified as being in the multi-path state or a GNSS signal of which the degree of the multi-path state is determined to be greater than or equal to a predetermined degree (or a GNSS signal transmitted by a satellite having a low priority).

The processor 240 may determine the location of the electronic device 101 using a third signal transmitted or received via the wireless communication circuit 230 in order to determine the location of the electronic device 101, based at least on the multi-path state of a GNSS signal or a reception environment. For example, if the degree of the multi-path state of the GNSS signal is greater than or equal to a predetermined degree, or if the reception environment is a canyon environment, the processor 240 may determine the location of the electronic device 101 using at least one of a Wi-Fi positioning system (WPS), cell positioning, pedestrian dead reckoning (PDR), dead reckoning (DR), or vision based positioning via the wireless communication circuit 230.

The processor 240 may store information associated with the multi-path state of a GNSS signal in a memory 130.

The processor 240 may transmit information associated with the multi-path state of a GNSS signal or information associated with a reception environment to a server, together with the information associated with the location of the electronic device 101, via the wireless communication circuit 230. The information associated with the multi-path state of a GNSS signal may include information (or satellite identity information) for identifying a satellite that transmits the GNSS signal, information associated with whether the GNSS signal is in the multi-path state, or information associated with the degree of the multi-path state of the GNSS signal. The processor 240 may transmit (upload or update) the information associated with the multi-path state of a GNSS signal or the information associated with a reception environment to the server in real time via the wireless communication circuit 230. If the server receives information associated with the multi-path state of a GNSS signal, the server may determine the reception environment (e.g., an open sky environment, a civil environment, or a canyon environment) of a location related to the multi-path state of the GNSS signal, based at least on the information associated with the multi-path state of the GNSS signal. The server may transmit the information associated with the multi-path state of the GNSS signal or the information associated with the reception environment to another electronic device in order to share the same with the other electronic device (or another user).

The electronic device 101 may further include a display device 160 or a memory 130.

According to an embodiment, the electronic device may include a GNSS reception circuit configured to receive a first signal having a first frequency and a second signal having a second frequency; a wireless communication circuit configured to support cellular communication and/or short-range communication; a processor operably connected to the GNSS reception circuit and the wireless communication circuit; and a memory operably connected to the processor, wherein the memory stores instructions that enable the processor to perform operations when the instructions are executed, the operations including receiving the first signal using the GNSS reception circuit; receiving the second signal using the GNSS reception circuit; receiving at least one third signal using the wireless communication circuit; determining existence of a multi-path state, based at least on the first signal and the second signal; and selecting at least one of the first signal, the second signal, or the third signal in order to determine the location of the electronic device, based at least on the determination.

The first signal and the second signal are received from the same satellite via different frequency bands; and the chip rate of the first signal and the chip rate of the second signal are different from each other.

Each of the first signal and the second signal includes an original signal transmitted from a GNSS device (e.g., a GNSS satellite) and a reflected signal which corresponds to a reflection of the transmitted signal.

The instructions enable the processor to perform obtaining a vector of the first signal and a vector of the second signal over time, based on original signals and reflected signals; and determining the multi-path states of the first signal and the second signal, based on the distribution of the vector of the first signal and the distribution of the vector of the second signal shown over time.

The instructions enable the processor to perform determining that the first signal and the second signal are in the multi-path state if a waveform of the vector of the first signal includes a peak point and a point at which at least one slope varies, and a waveform of the vector of the second signal includes a plurality of different peak points.

The instructions enable the processor to determine that the first signal and the second signal are in the multi-path state if a waveform of the vector of the second signal includes a plurality of different peak points within a predetermined period of time.

The instructions enable the processor to determine whether the first signal and the second signal are in the multi-path state, based at least on time intervals between the original signals and the reflected signals.

The instructions enable the processor to perform selecting the first signal if it is determined that the first signal and the second signal are not in the multi-path state; and selecting the first signal and the second signal, or selecting at least one third signal if it is determined that the first signal and the second signal are in the multi-path state.

The instructions enable the processor to determine a reception environment where the first signal and the second signal are received, based at least on the multi-path state.

The instructions enable the processor to store information associated with the determined reception environment in the memory, or to store the same in an external server using the wireless communication circuit.

According to an embodiment, the electronic device may include a GNSS reception circuit configured to receive a first signal having a first frequency and a second signal having a second frequency; a processor operably connected to the GNSS reception circuit; and a memory operably connected to the processor, wherein the memory stores instructions which enable the processor to perform operations when the instructions are executed, the operations including receiving the first signal using the GNSS reception circuit; receiving the second signal using the GNSS reception circuit; determining existence of a multi-path state, based at least on the first signal and the second signal; and determining a reception environment where the first signal and the second signal are received, based at least on the determination.

The electronic device may further include a wireless communication circuit configured to support cellular communication and/or short-range communication, and may further store the instructions which enable the processor to perform receiving at least one third signal using the wireless communication circuit; and selecting a scheme of determining the location of the electronic device using at least one of the first signal or the second signal, or a scheme of determining the location of the electronic device using the third signal, based at least on determining the existence of the multi-path state.

The first signal and the second signal are received from the same satellite via different frequency bands, and the chip rate of the first signal and the chip rate of the second signal are different from each other.

Each of the first signal and the second signal includes an original signal transmitted by a GNSS device (e.g., GNSS satellite), and a reflected signal corresponding to a reflection of the transmitted signal.

Figure 8:
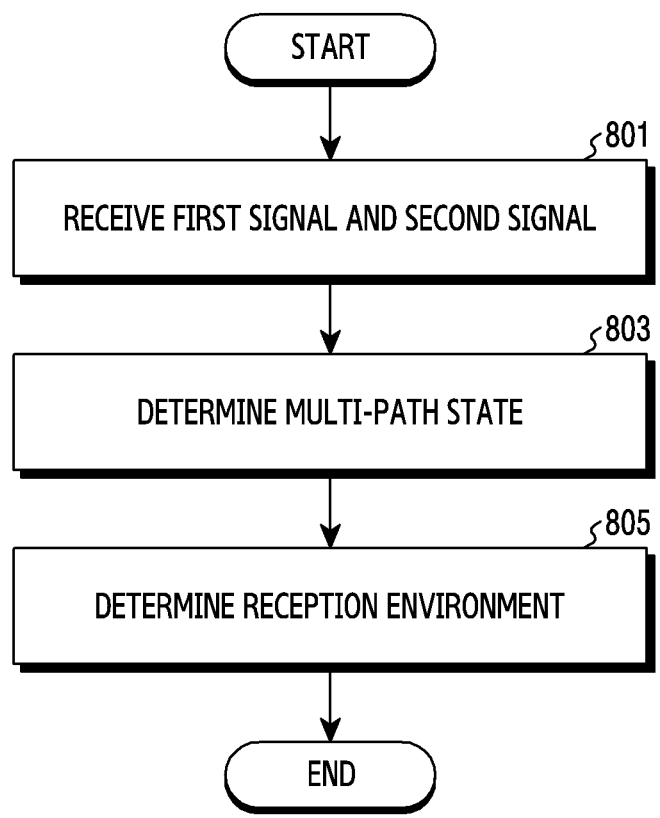
FIG. 8 is a flowchart illustrating a method of detecting the multi-path state of a GNSS signal, according to an embodiment.

FIG. 8 is a flowchart illustrating a method of detecting the multi-path state of a GNSS signal according to various embodiments.

Referring to FIG. 8, in step 801, the processor 240 receives a first signal and a second signal from a satellite (or GNSS device) via the first antenna 211 and the second antenna 213.

Each of the first signal and the second signal may include a PRN code, a navigation message (or navigation message data), and a carrier. Each of the first signal and the second signal may include an original signal and a reflected signal.

The first antenna 211 and the second antenna 213 that receive a first signal and a second signal from a satellite may transfer the received first signal and second signal to the GNSS reception circuit 220. The GNSS reception circuit 220 may convert the first signal and the second signal in the analog form into the first signal and the second signal in the digital form, and may transmit the first signal and the second signal in the digital form to the processor 240.

In step 803, the processor 240 determines the multi-path states of the first signal and the second signal.

The processor 240 may receive the first signal and the second signal in the digital form from the GNSS reception circuit 220.

The processor 240 may perform a code synchronization operation. The processor 240 may generate a replica code which is identical to the C/A code for each of the first signal and the second signal. The processor 240 may synchronize the C/A code and the replica signal for each of the first signal and the second signal, using a correlator.

The processor 240 may synchronize the C/A code and the replica code for each of the first signal and the second signal, so as to obtain a first signal vector and a second signal vector.

The processor 240 may detect the multi-path state of a GNSS signal (or the first signal and the second signal), based at least on the first signal vector or the second signal vector (or the distribution of the first signal vector or the second signal vector).

The processor 240 may detect the multi-path state of a GNSS signal, based at least on the waveform of the first signal vector and the waveform of the second signal vector.

Referring again to FIG. 3, as shown in the graph 301, if it is identified that each of the first signal vector 311 and the second signal vector 321 includes a peak point 331, the processor 240 may determine that the first signal and the second signal include only a first original signal and a second original signal, respectively.

If it is determined that the first signal and the second signal include only the first original signal and the second original signal, respectively, the processor 240 may determine that a GNSS signal is not in the multi-path state.

As shown in the graph 303, if it is identified that the first signal vector 351 includes at least one point (e.g., the point 375 and the point 373) at which a slope changes and the second signal vector 361 includes a plurality of different peak points (e.g., the peak point 372 and the peak point 374), the processor 240 may determine that the first signal and the second signal include a first reflected signal and a second reflected signal in addition to the first original signal and the second original signal.

If it is identified that the second signal vector 361 includes a plurality of peak points, the processor 240 may identify whether the first signal vector 351 includes at least one point (e.g., the point 375 and the point 373) at which a slope changes. For example, if it is identified that the second signal vector includes a plurality of peak points, the processor 240 may identify whether the first signal vector includes at least one point at which a slope changes.

As shown in the graph 303, if it is identified that the waveform of the first signal vector 351 is a waveform in the form of a circle centered on a single point 371 and the second signal vector 361 includes a plurality of different points (i.e., the peak point 372 and the peak point 374), the processor 240 may determine that the first signal and the second signal include a first reflected signal and/or a second reflected signal in addition to the first original signal and the second original signal.

If it is determined that the first signal and the second signal include the first reflected signal and/or the second reflected signal in addition to the first original signal and the second original signal, the processor 240 may determine that a GNSS signal is in the multi-path state.

The processor 240 may detect the multi-path state of a GNSS signal, based on the waveform of the second signal vector.

If it is identified that the second signal vector further includes at least one peak point in addition to the peak point of the second original signal vector within a predetermined period of time, the processor 240 may determine the second signal includes a reflected signal.

If it is determined that the second signal includes the reflected signal, the processor 240 may determine that a GNSS signal is in the multi-path state.

The processor 240 may determine the number of second reflected signals, depending on the number of peak points that the second signal vector includes in addition to the peak point of the second original signal vector within a predetermined period of time. For example, if it is identified that the second signal vector further includes two peak points in addition to the peak point of the second original signal vector within a predetermined period of time, the processor 240 may determine the second signal includes two second reflected signals.

If it is determined that the number of peak points for the second signal vector includes the peak point of the second original signal vector during a predetermined period of time, the processor 240 may determine that a GNSS signal is in the multi-path state.

As the second signal vector includes a larger number of peak points in addition to the peak point of the second original signal vector during a predetermined period of time, the degree of the multi-path state of a GNSS signal is determined to be higher.

The processor 240 may detect the multi-path state of a GNSS signal, based on the difference in reception time between an original signal and a reflected signal.

The processor 240 may obtain (or calculate) the difference between a time corresponding to the peak point of the second reflected signal vector and a time corresponding to the peak point of the second original signal vector.

The processor 240 may obtain the difference between a time corresponding to a point at which the slope of the first signal vector is changed and a time corresponding to the peak point of the first signal vector.

The processor 240 may determine that a GNSS signal is in the multi-path state, if it is determined that the difference in reception time between an original signal and a reflected signal is less than or equal to a predetermined period of time.

As the difference in reception time between an original signal and a reflected signal becomes shorter, the degree of the multi-path state of a GNSS signal is determined to be higher.

The processor 240 may detect the multi-path state of a GNSS signal, based on the waveform of the first signal vector.

As the difference between a time corresponding to the peak point of the first signal vector and a time corresponding to the peak point of a first original signal vector becomes longer, a first signal includes a larger number of reflected signals.

If the difference between a time corresponding to the peak point of the first signal vector and a time corresponding to the peak point of the first original signal vector becomes longer, this indicates that the electronic device 101 is moved to a place where building or structures are more concentrated than a previous location.

If the difference between a time corresponding to the peak point of the first signal vector and a time corresponding to the peak point of the first original signal vector is greater than or equal to a predetermined period of time, the processor 240 may determine that a GNSS signal is in the multi-path state.

As the difference between a time corresponding to the peak point of the first signal vector and a time corresponding to the peak point of the first original signal vector becomes longer, the degree of the multi-path state of a GNSS signal is determined by the processor 240 to be higher.

The processor 240 may determine the degree of the multi-path state of a GNSS signal in consideration of the altitude of a satellite that transmits the GNSS signal. The processor 240 may determine the altitude of a satellite, based on ephemeris information included in a navigation message. If the altitude of a satellite is low, the processor 240 may provide (or apply) a low weight to the determined degree of the multi-path state of a GNSS signal. If the altitude of a satellite is high, the processor 240 may apply a high weight to the determined degree of the multi-path state of a GNSS signal. The processor 240 may determine (or re-determine) the degree of the multi-path state of a GNSS signal, based at least on the determined degree of the multi-path state of a GNSS signal and a weight applied to a satellite (or multiplying the determined degree of the multi-path state of a GNSS signal and a weight applied to a satellite).

In step 805, the processor 240 determines an environment where a GNSS signal is received, based at least on the multi-path state of a GNSS signal. If it is determined that a GNSS signal is not in the multi-path state (or if it is determined that a GNSS signal includes only an original signal excluding a reflected signal), the processor 240 may determine that a reception environment is an open sky environment.

If it is determined that a GNSS signal is in the multi-path state (or if it is determined that a GNSS signal includes an original signal and a reflected signal), the processor 240 may determine that a reception environment is a civil environment.

If it is determined that a GNSS signal includes only a reflected signal excluding an original signal, the processor 240 may determine that a reception environment is a canyon (or deep urban) environment.

The processor 240 may determine that a reception environment is a civil environment or a canyon environment depending on the degree of the multi-path state of a GNSS signal. For example, if the degree of the multi-path state of a GNSS signal is greater than or equal to a predetermined degree, the processor 240 may determine a reception environment to be a canyon environment. If the degree of the multi-path state of a GNSS signal is less than a predetermined degree, the processor 240 may determine a reception environment to be a civil environment.

The processor 240 may determine a reception environment based at least on a plurality of GNSS signals received from a plurality of satellites.

The processor 240 may determine a multi-path state with respect to each of a plurality of GNSS signals received from a plurality of satellites.

If the number of satellites that transmit GNSS signals is less than or equal to a predetermined number (e.g., 8), the processor 240 may determine that a reception environment is a canyon environment. If the number of satellites that transmit GNSS signals is less than or equal to a predetermined number (e.g., 4), the processor 240 may determine that a reception environment is an environment where the measurement of a location is not allowed.

If the number of satellites that transmit GNSS signals is greater than or equal to a predetermined number (e.g., approximately 10), and the number of satellites that transmit GNSS signals identified as being in the multi-path state is greater than or equal to a predetermined number (e.g., approximately 5), the processor 240 may determine that a reception environment is a civil environment.

The processor 240 may determine a reception environment based at least on the altitude of a satellite. The processor 240 may determine the altitude of a satellite that transmits a GNSS signal. The processor 240 may determine a reception environment based at least on a GNSS signal transmitted by a satellite identified as having an altitude greater than or equal to a predetermined altitude, excluding a GNSS signal transmitted by a satellite identified as having an altitude less than the predetermined altitude.

The processor 240 may determine whether a reception environment is a canyon environment, based at least on a relative change of a plurality of GNSS signal vectors received from a plurality of satellites.

If the reception environment of the electronic device 101 is an open sky environment or a civil environment, and the satellite or the electronic device 101 is moving, the degree of the multi-path state of each GNSS signal may be changed. If the reception environment of the electronic device 101 is changed from an open sky environment or a civil environment to a canyon environment, the degree of the multi-path state of each GNSS signal is changed, and some of a plurality of satellites may transmit a GNSS signal including only a reflected signal excluding an original signal.

A time interval corresponds to a time between a GNSS signal vector transmitted by a satellite that transmits a GNSS signal including only a reflected signal excluding an original signal and a GNSS signal vector of a GNSS signal transmitted by another satellite (or a GNSS signal that transmits an original signal and a reflected signal). If the degree of the multi-path state of each of a plurality of GNSS signals changes and the time interval between GNSS signal vectors corresponding to a plurality of GNSS signals transmitted from different satellites is changed, the processor 240 may determine that the reception environment is a canyon environment, or may determine that the reception environment is changed from an open sky environment or civil environment to a canyon environment.

If the degree of the multi-path state of each of a plurality of GNSS signals changes, and the time interval between GNSS signal vectors corresponding to a plurality of GNSS signals transmitted from different satellites is maintained, the processor 240 may determine that the reception environment is an open sky environment or a civil environment, or may determine that an open sky environment or civil environment is maintained.

The processor 240 may determine priorities of a plurality of satellites, based at least on the multi-path state of each of a plurality of GNSS signals received from the plurality of satellites. For example, the processor 240 may provide a high priority to a satellite that transmits a GNSS signal identified as not being in the multi-path state among a plurality of satellites, and may provide a low priority to a satellite that transmits a GNSS signal identified being in the multi-path state. Additionally or alternatively, the processor 240 may assign a priority to a satellite according to the degree of the multi-path state of a GNSS signal transmitted by each of a plurality of satellites. For example, the processor 240 may assign a highest priority to a satellite that transmits a GNSS signal with a lowest degree of the multi-path state of a GNSS signal. The processor 240 may determine the location of the electronic device 101, based at least on GNSS signals transmitted by a predetermined number of satellites, in an order based on satellites having the highest priority.

Figure 9:
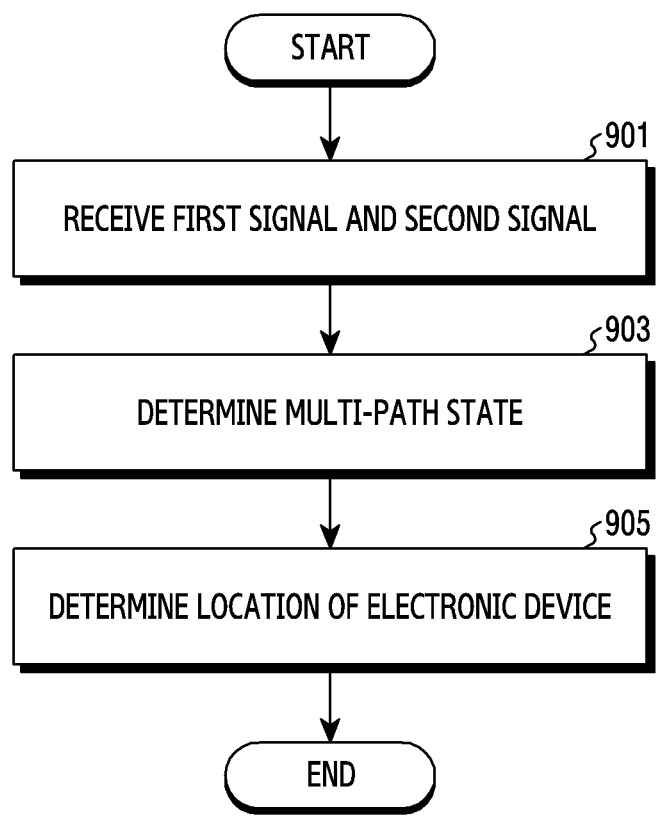
FIG. 9 is a flowchart illustrating a method of determining the location of an electronic device, based at least on a GNSS signal, according to an embodiment.

FIG. 9 is a flowchart illustrating a method of determining the location of the electronic device 101, based at least on a GNSS signal, according to an embodiment.

Referring to FIG. 9, in step 901, the processor 240 receives a first signal and a second signal from a satellite (or GNSS device) via the first antenna 211 and the second antenna 213.

In step 903, the processor 240 determines the multi-path states of the first signal and the second signal.

Step 901 and step 903 of FIG. 9 are at least partially the same as or similar to step 801 and step 803 of FIG. 8, and thus, detailed descriptions thereof will be omitted.

In step 905, the processor 240 determines (or measures) the location of the electronic device 101, based at least on the multi-path state of a GNSS signal (or the first signal and the second signal).

The processor 240 may select at least one of the first signal or the second signal in order to determine the location of the electronic device 101, based at least on the multi-path state of a GNSS signal. For example, if it is determined that a GNSS signal is not in the multi-path state, the processor 240 may select the first signal as a signal for determining the location of the electronic device 101. If it is determined that a GNSS signal is in the multi-path state, the processor 240 may select the first signal and the second signal as signals for determining the location of the electronic device 101.

The processor 240 may select at least one of the first signal or the second signal in order to determine the location of the electronic device 101, based at least on a reception environment. For example, if it is determined that the reception environment is an open sky environment, the processor 240 may select the first signal as a signal for determining the location of the electronic device 101. Additionally or alternatively, if it is determined that the reception environment is a civil environment or a canyon environment, the processor 240 may select the first signal and the second signal as signals for determining the location of the electronic device 101.

If the location of the electronic device 101 is determined using the first signal and the second signal, the location of the electronic device 101 may be determined more accurately than the case of using only the first signal to determine the location of the electronic device 101, but may consume a larger amount of power.

The processor 240 may determine the location of the electronic device 101 using at least one of the selected first signal or second signal. In addition, the processor 240 may determine the location of the electronic device 101, based at least on a pseudo range based on a code delay obtained via a code synchronization operation, ephemeris information included in a navigation message, and correction information (e.g., an ionosphere delay error, a troposphere delay error, and an astronomical calendar and satellite clock error), using at least one of the selected first signal or second signal.

The processor 240 may determine the location of the electronic device 101 using a third signal transmitted or received via the wireless communication circuit 230 in order to determine the location of the electronic device 101, based at least on the multi-path state of a GNSS signal or a reception environment. For example, if the degree of the multi-path state of a GNSS signal is greater than or equal to a predetermined degree, or if the reception environment is a canyon environment, the processor 240 may determine the location of the electronic device 101 using at least one of a WPS, cell positioning, PDR, DR, or vision based positioning via the wireless communication circuit 230.

Figure 10:
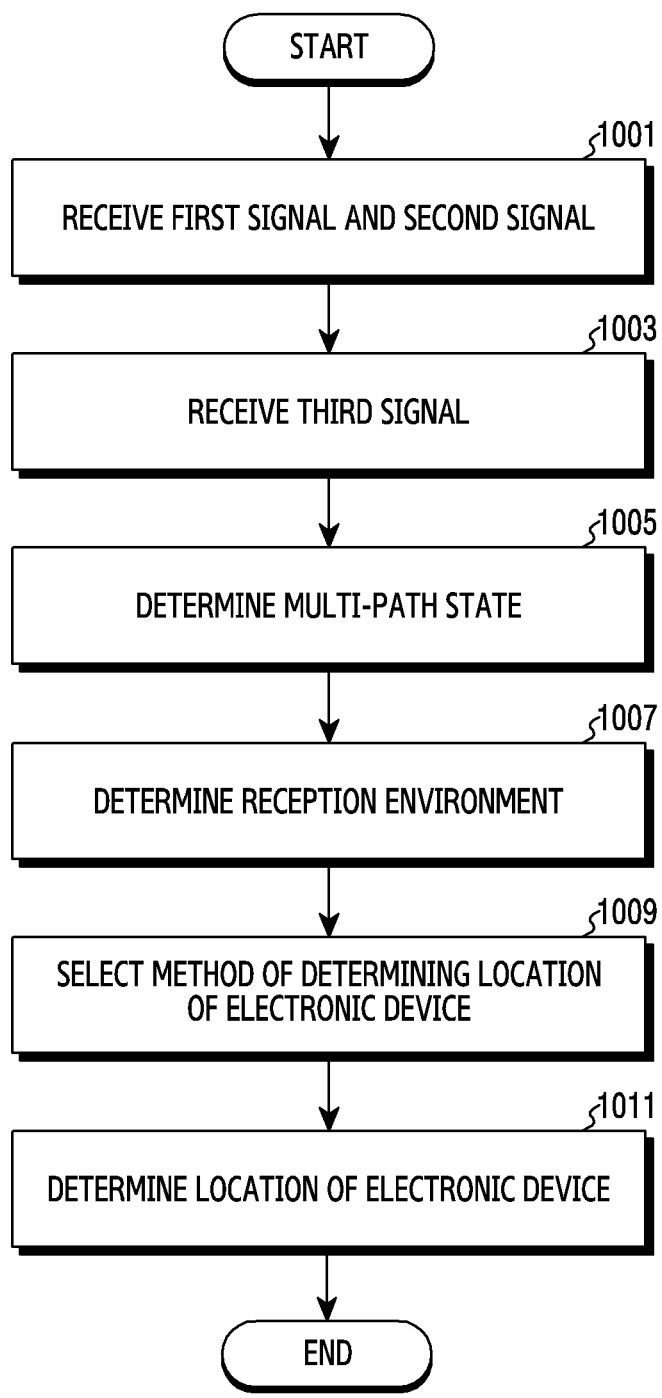
FIG. 10 is a flowchart illustrating a method of determining the location of an electronic device, according to an embodiment.

FIG. 10 is a flowchart illustrating a method of determining the location of an electronic device, according to an embodiment.

Referring to FIG. 10, in step 1001, the processor 240 receives a first signal and a second signal from a satellite (or GNSS device) via the first antenna 211 and the second antenna 213. Step 1001 of FIG. 10 is at least partially the same as or similar to step 801 of FIG. 8 and thus, detailed descriptions thereof will be omitted.

In step 1003, the processor 240 receives a third signal via the wireless communication circuit 230.

The third signal may be a signal for cellular communication or a signal for short-range wireless communication.

The third signal may be a signal to be used for at least one of a WPS, cell positioning, PDR, DR, or vision based positioning.

In step 1005, the processor 240 determines the multi-path states of the first signal and the second signal. Step 1005 of FIG. 10 is at least partially the same as or similar to step 803 of FIG. 8 and thus, detailed descriptions thereof will be omitted.

In step 1007, the processor 240 determines an environment where a GNSS signal is received, based at least on the multi-path state of a GNSS signal. Step 1007 of FIG. 10 is at least partially the same as or similar to step 805 of FIG. 8 and thus, detailed descriptions thereof will be omitted.

In step 1009, the processor 240 selects a method of determining the location of the electronic device 101, based on at least one of the multi-path states of the first signal and the second signal or a reception environment.

The processor 240 may determine the location of the electronic device 101 using at least one of the first signal or the second signal. For example, if it is determined that the first signal and the second signal are not in the multi-path state, the processor 240 may select a method of determining the location of the electronic device using at least one of the first signal or the second signal.

If it is determined that the first signal and the second signal are in the multi-path state, the processor 240 may select a method of determining the location of the electronic device using the third signal. For example, if it is determined that the first signal and the second signal are in the multi-path state, the processor 240 may select a WPS, cell positioning, PDR, DR, or vision based positioning.

In step 1011, the processor 240 determines the location of the electronic device 101.

The processor 240 may determine the location of the electronic device 101 using a method of at least one of the first signal or second signal. For example, the processor 240 may determine the location of the electronic device 101, based at least on a pseudo range based on a code delay obtained via a code synchronization operation, ephemeris information included in a navigation message, and correction information (e.g., an ionosphere delay error, a troposphere delay error, and an astronomical calendar and satellite clock error), using at least one of the first signal or the second signal.

The processor 240 may determine the location of the electronic device 101 via a WPS, cell positioning, PDR, DR, or a vision based positioning scheme, based at least on the third signal.

Figure 11:
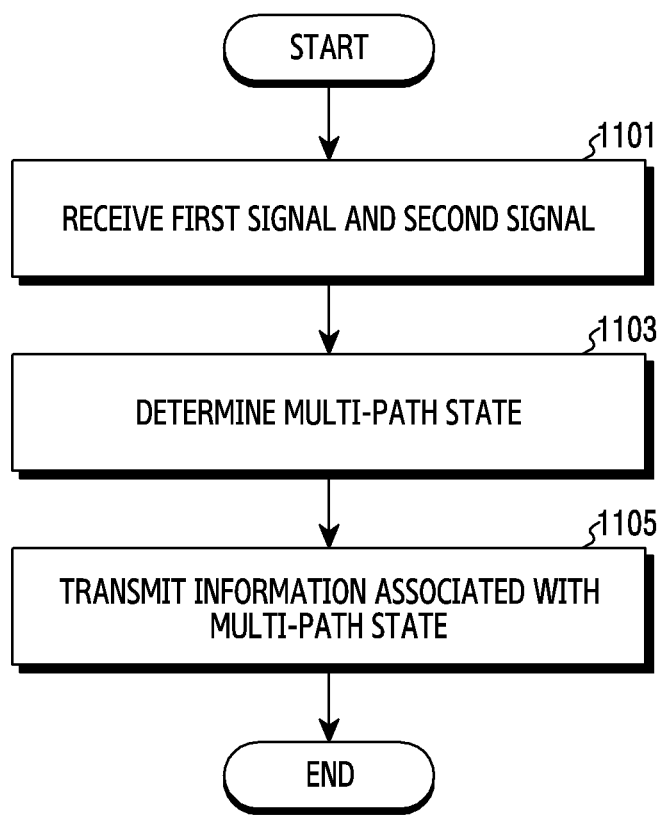
FIG. 11 is a flowchart illustrating a method of sharing information associated with a multi-path state with another electronic device, according to an embodiment.

FIG. 11 is a flowchart illustrating a method of sharing information associated with a multi-path state with another electronic device, according to an embodiment.

Referring to FIG. 11, in step 1101, the processor 240 receives a first signal and a second signal from a satellite (or GNSS device) via the first antenna 211 and the second antenna 213.

In step 1103, the processor 240 determines the multi-path states of the first signal and the second signal.

Step 1101 and step 1103 of FIG. 11 are at least partially the same as or similar to step 801 and step 803 of FIG. 8, and thus, detailed descriptions thereof will be omitted.

In step 1105, the processor 240 stores information associated with the multi-path state (or reception environment) of a GNSS signal and transmits the same to a server, together with information associated with the location of the electronic device 101.

The information associated with the multi-path state of a GNSS signal may include information (such as satellite identity information) for identifying a satellite that transmits the GNSS signal, information associated whether the GNSS signal is in the multi-path state, or information associated with the degree of the multi-path state of the GNSS signal.

The processor 240 may transmit (upload or update) the information associated with the multi-path state of a GNSS signal or the information associated with a reception environment to the server in real time via the wireless communication circuit 230.

If the server receives information associated with the multi-path state of a GNSS signal, the server may determine the reception environment (e.g., an open sky environment, a civil environment, or a canyon environment) of a location related to the multi-path state of the GNSS signal. The server may transmit information associated with the multi-path state of a GNSS signal or information associated with a reception environment to another electronic device.

The processor 240 may store information associated with the multi-path state of a GNSS signal in a memory 130.

Figure 12:
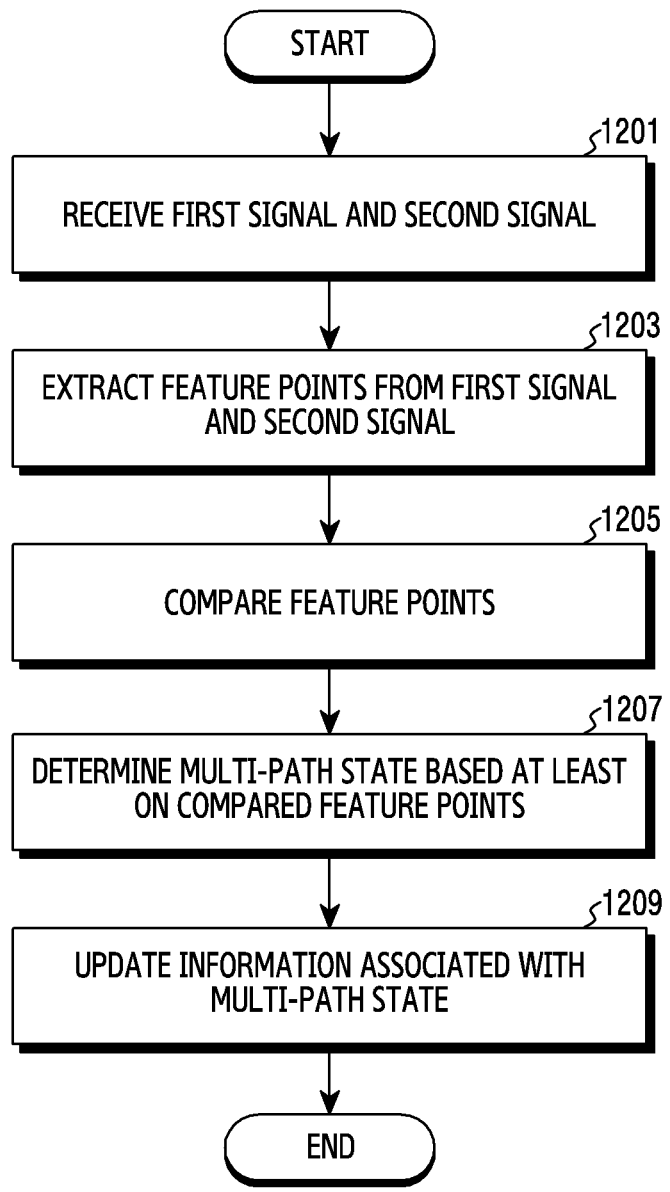
FIG. 12 is a flowchart illustrating a method of detecting the multi-path state of a GNSS signal, according to an embodiment.

FIG. 12 is a flowchart illustrating a method of detecting the multi-path state of a GNSS signal, according to an embodiment.

Referring to FIG. 12, in step 1201, the processor 240 receives a first signal and a second signal from a satellite (or GNSS device) via the first antenna 211 and the second antenna 213. Step 1201 of FIG. 12 is at least partially the same as or similar to step 801 of FIG. 8 and thus, detailed descriptions thereof will be omitted.

In step 1203, the processor 240 extracts feature points from the first signal and the second signal. For example, the processor 240 may extract feature points for deriving the relationship between the first signal and the second signal.

The processor 240 may receive the first signal and the second signal in the digital form from the GNSS reception circuit 220.

The processor 240 may perform a code synchronization operation. The processor 240 may generate a replica code which is identical to the C/A code of each of the first signal and the second signal. The processor 240 may synchronize the C/A code and the replica signal with respect to each of the first signal and the second signal, using a correlator.

The processor 240 may synchronize the C/A code and the replica code for each of the first signal and the second signal, so as to obtain a first signal vector and a second signal vector.

The processor 240 may extract feature points from a first signal vector and a second signal vector. For example, the processor 240 may identify the first signal vector or the second signal vector (or the distribution of first signal vector or second signal vector). The processor 240 may extract, as a feature point, at least one peak point from each of the first signal vector and the second signal vector.

In step 1205, the processor 240 may compare the extracted feature points. Referring again to FIG. 3, as shown in the graph 301, if it is identified that each of the first signal vector 311 and the second signal vector 321 includes a single peak point 331, the processor 240 may determine that the first signal and the second signal include only a first original signal and a second original signal, respectively.

As shown in the graph 303, if it is identified that the first signal vector 311 includes at least one point (i.e., the point 375 and the point 373) at which a slope changes, and the second signal vector includes a plurality of different points (i.e., the peak point 372 and the peak point 374), the processor 240 may determine that the first signal and the second signal include a first reflected signal and a second reflected signal in addition to a first original signal and a second original signal.

If it is identified that the second signal vector 361 includes a plurality of peak points (i.e., peak point 372 and peak point 374), the processor 240 may identify whether the first signal vector 351 includes at least one point (i.e., the point 375 and the point 3737) at which a slope changes. For example, if it is identified that the second signal vector 361 includes a plurality of peak points (i.e., peak point 372 and peak point 374), the processor 240 may identify whether the first signal vector 351 includes at least one point at which a slope changes.

As shown in the graph 303, if it is identified that the waveform of the first signal, vector 351 is a waveform in the form of a circle centered on a single point 371 and the second signal vector 361 includes a plurality of different points (i.e., the peak point 372 and the peak point 374), the processor 240 may determine that the first signal and the second signal include a first reflected signal and/or a second reflected signal in addition to the first original signal and the second original signal.

If it is identified that the second signal vector 361 further includes at least one peak point in addition to the peak point of the second original signal vector 361-1 within a predetermined period of time, the processor 240 may determine the second signal includes a reflected signal.

The processor 240 may determine the number of second reflected signals, depending on the number of peak points that the second signal vector 361 includes in addition to the peak point of the second original signal vector 361-1 within a predetermined period of time. For example, if it is identified that the second signal vector 361 further includes two peak points in addition to the peak point of the second original signal vector 361-1 within a predetermined period of time, the processor 240 may determine that the second signal includes two second reflected signals.

The processor 240 may obtain (or calculate) the difference between a time corresponding to the peak point of the second reflected signal vector 361-3 and a time corresponding to the peak point of the second original signal vector 361-1.

The processor 240 may obtain the difference between a time corresponding to a point at which the slope of the first signal vector 351 changes and a time corresponding to the peak point of the first signal vector 351.

As the difference between a time corresponding to the peak point of the first signal vector 351 and a time corresponding to the peak point of the first original signal vector 351-1 becomes longer, the first signal includes a larger number of reflected signals.

If the difference between a time corresponding to the peak point of the first signal vector 351 and a time corresponding to the peak point of the first original signal vector 351-1 is changed to be longer than before, this indicates that the electronic device 101 is moved to a place where building or structures are more concentrated than a previous location.

In step 1207, the processor 240 determines the multi-path states of a satellite, based at least on the compared feature points.

If it is determined that the first signal and the second signal include only the first original signal and the second original signal, respectively, the processor 240 may determine that a GNSS signal is not in the multi-path state.

If it is determined that the first signal and the second signal include the first reflected signal and/or the second reflected signal in addition to the first original signal and the second original signal, the processor 240 may determine that a GNSS signal is in the multi-path state.

If it is determined that the second signal includes a reflected signal, based on the waveform of the second signal vector, the processor 240 may determine that a GNSS signal is in the multi-path state.

If it is determined that the number of peak points that the second signal vector includes in addition to the peak point of the second original signal vector within a predetermined period of time, the processor 240 may determine that a GNSS signal is in the multi-path state.

As the second signal vector includes a larger number of peak points in addition to the peak point of the second original signal vector during a predetermined period of time, the degree of the multi-path state of a GNSS signal is determined to become higher.

The processor 240 may determine that a GNSS signal is in the multi-path state, if it is determined that the difference in reception time between an original signal and a reflected signal is less than or equal to a predetermined period of time.

As the difference in reception time between an original signal and a reflected signal becomes shorter, the degree of the multi-path state of a GNSS signal is determined to become higher.

If the difference between a time corresponding to the peak point of the first signal vector and a time corresponding to the peak point of the first original signal vector is greater than or equal to a predetermined period of time, the processor 240 may determine that a GNSS signal is in the multi-path state.

As the difference between a time corresponding to the peak point of the first signal vector and a time corresponding to the peak point of the first original signal vector becomes longer, the degree of the multi-path state of a GNSS signal is determined by the processor 240 to become higher.

In step 1209, the processor updates information associated with the multi-path state.

The processor 240 may transmit the information associated with the multi-path state of a GNSS signal to the server.

The processor 240 may store information associated with the multi-path state of a GNSS signal in the memory 130 of the electronic device 101.

The information associated with the multi-path state of a GNSS signal may include information (or satellite identity information) for identifying a satellite that transmits the GNSS signal, information associated with whether the GNSS signal is in the multi-path state, or information associated with the degree of the multi-path state of the GNSS signal.

The processor 240 may transmit (upload or update) the information associated with the multi-path state of a GNSS signal to the server in real time via the wireless communication circuit 230.

Figure 13:
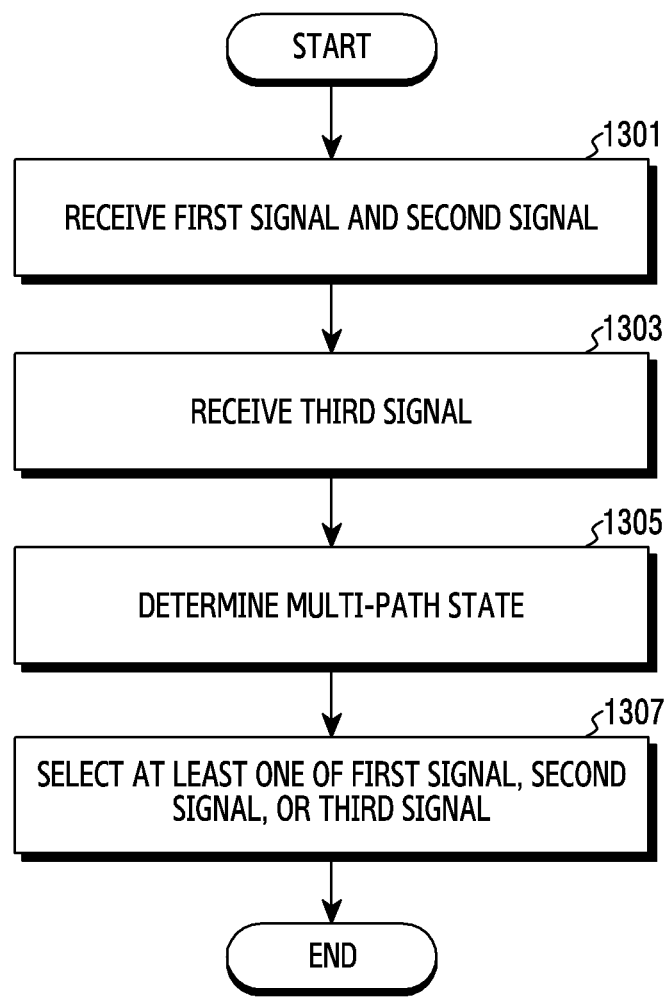
FIG. 13 is a flowchart illustrating a method of detecting the multi-path state of a GNSS signal, according to an embodiment.

FIG. 13 is a flowchart illustrating a method of detecting the multi-path state of a GNSS signal, according to an embodiment.

Referring to FIG. 13, in step 1301, the processor 240 receives a first signal and a second signal from a satellite (or GNSS device) via the first antenna 211 and the second antenna 213. Step 1301 of FIG. 13 is at least partially the same as or similar to step, 801 of FIG. 8 and thus, detailed descriptions thereof will be omitted.

In step 1303, the processor 240 receives a third signal received via the wireless communication circuit 230.

The third signal may be a signal for cellular communication or a signal for short-range wireless communication.

The third signal may be a signal to be used for at least one of a WPS, cell positioning, PDR, DR, or vision based positioning.

In step 1305, the processor 240 determines the multi-path states of the first signal and the second signal. Step 1305 of FIG. 13 is at least partially the same as or similar to step 803 of FIG. 8 and thus, detailed descriptions thereof will be omitted.

In step 1307, the processor 240 selects at least one of the first signal, the second signal, or the third signal in order to determine the location of the electronic device 101, based at least on the multi-path states of the first signal and the second signal.

If it is determined that the first signal and the second signal are not in the multi-path state, the processor 240 may select the first signal as a signal for determining the location of the electronic device 101.

If it is determined that the first signal and the second signal are in the multi-path state, the processor 240 may select the first signal and the second signal, or may select the third signal, as a signal for determining the location of the electronic device 101. For example, if the degree of the multi-path state of the first signal and the second signal is lower than a predetermined degree, the processor 240 may select the first signal and the second signal. Additionally or alternatively, if the degree of the multi-path state of the first signal and the second signal is greater than or equal to a predetermined degree, the processor 240 may select the third signal.

The processor 240 may select at least one of the first signal, the second signal, or the third signal in order to determine the location of the electronic device 101, based at least on a reception environment. For example, if it is determined that the reception environment is an open sky environment, the processor 240 may select the first signal as a signal for determining the location of the electronic device 101. Additionally or alternatively, if it is determined that the reception environment is a civil environment, the processor 240 may select the first signal and the second signal as signals for determining the location of the electronic device 101. Additionally or alternatively, if the reception environment is a canyon environment, the processor 240 may select the third signal as a signal for determining the location of the electronic device 101.

Figure 14A:
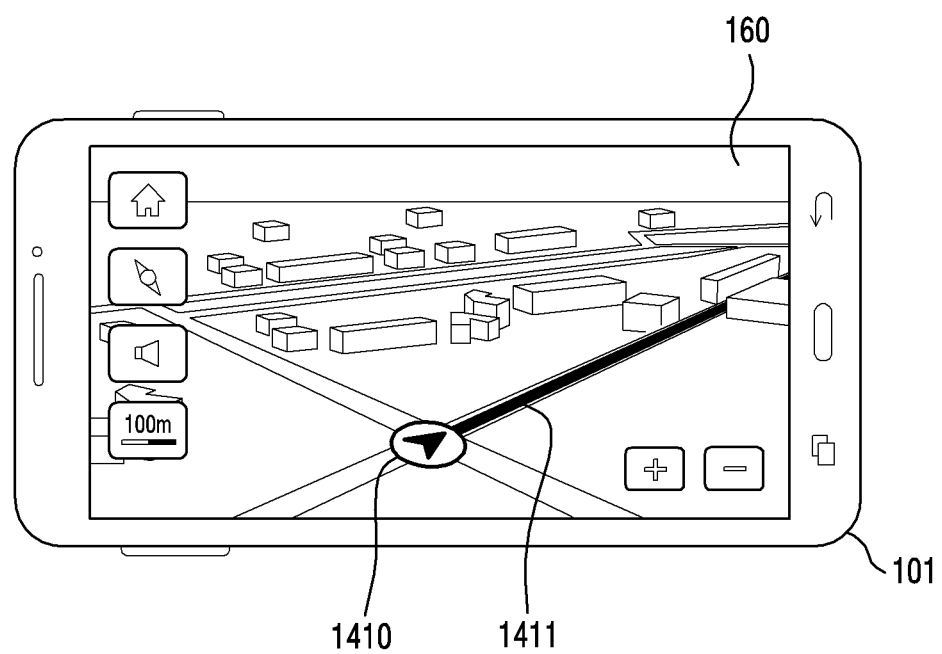
FIG. 14A is a diagram illustrating a method of providing information associated with the multi-path state of a GNSS signal, according to an embodiment.

FIG. 14A is a diagram illustrating a method of providing information associated with the multi-path state of a GNSS signal, according to an embodiment.

Figure 14B:
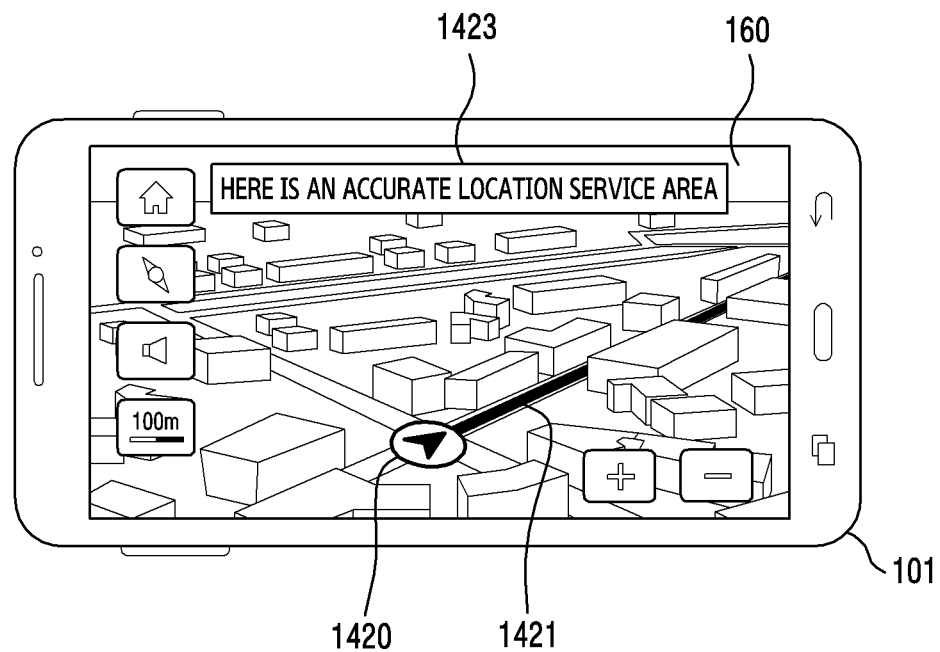
FIG. 14B is a diagram illustrating a method of providing information associated with the multi-path state of a GNSS signal, according to an embodiment.

FIG. 14B is a diagram illustrating a method of providing information associated with the multi-path state of a GNSS signal, according to an embodiment.

Figure 14C:
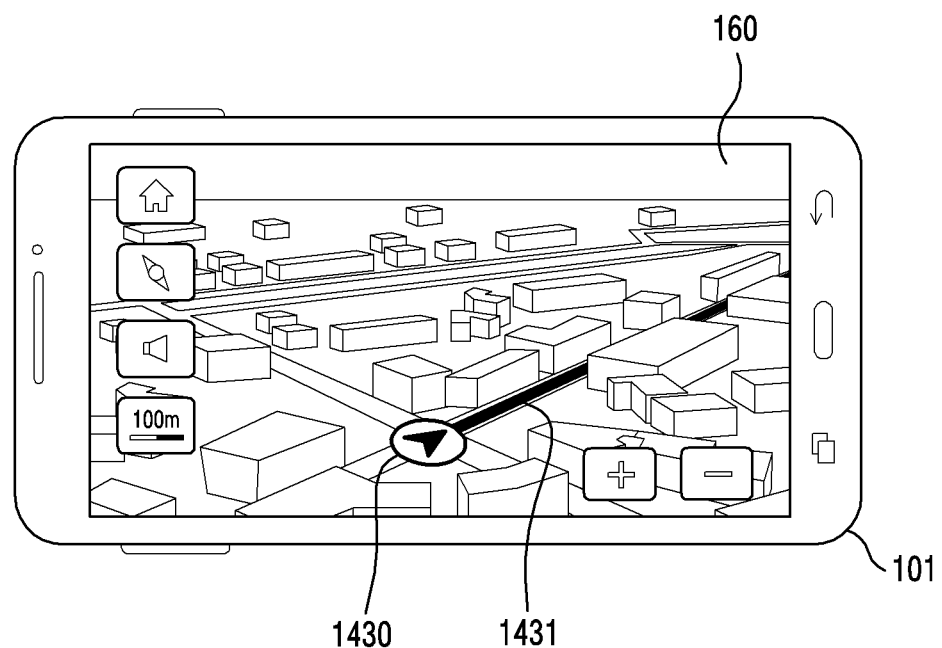
FIG. 14C is a diagram illustrating a method of providing information associated with the multi-path state of a GNSS signal, according to an embodiment.

FIG. 14C is a diagram illustrating a method of providing information associated with the multi-path state of a GNSS signal, according to an embodiment.

FIG. 14A may be a navigation screen displayed via the display device 160 if a reception environment is a civil environment.

As illustrated in FIG. 14A, if the reception environment is a civil environment, the processor 240 may normally display an object 1410 corresponding to the current location of the electronic device 101 (or vehicle) and a path 1411 to a destination, via the display device 160.

The processor 240 may determine the location of the electronic device 101, based at least on a GNSS signal which is identified as not being in the multi-path state, by excluding a GNSS signal identified as being in the multi-path state (or a satellite that transmits a GNSS signal identified as being in the multi-path state).

FIG. 14B is a navigation screen displayed via the display device 160 if a reception environment is a canyon environment.

If the reception environment is a canyon environment, the processor 240 may determine the location of the electronic device 101 using a real time kinematic scheme or a vehicle to vehicle (V2X) scheme. For example, if the reception environment is a canyon environment, the processor 240 may have difficulty in determining the accurate location of the electronic device 101 using a GNSS signal, and may change a location determination scheme used by the electronic device 101.

If the location of the electronic device is determined using a real time kinematic scheme or V2X scheme, the processor 240 may output information 1423 such as "Here is an accurate location service area." indicating that an accurate location determination scheme such as the real time kinematic scheme or the V2X scheme is used, together with an object 1420 corresponding to the current location of the electronic device 101 and a path 1421 to a destination, via the display device 160, as illustrated in FIG. 14B.

FIG. 14C is a navigation screen displayed via the display device 160 if a reception environment is a civil environment.

If the reception environment is a civil environment, the processor 240 may have difficulty in determining the location of the electronic device 101 using a GNSS signal. If it is difficult to determine the location of the electronic device 101 based on a GNSS signal, the processor 240 may output information indicating that it is difficult to determine the location of the electronic device 101 based on a GNSS signal. For example, if it is difficult to determine the location of the electronic device 101 based on a GNSS signal, the processor 240 may display at least one of the color of an object 1430 indicating the current location of the electronic device 101 or the color of a path 1431 to a destination, using a first color (e.g., grey) via the display device 160. Additionally or alternatively, if the location of the electronic device 101 is accurately obtainable based on a GNSS signal, the processor 240 may display at least one of the color of the object 1430 indicating the current location of the electronic device 101 or the color of the path 1431 to a destination, using a second color (e.g., green) via the display device 160. However, the method of outputting information indicating that it is difficult to determine the location of the electronic device 101 based on a GNSS signal, is not limited to the above-described example.

A method, according to an embodiment, may include receiving a first signal using a GNSS reception circuit configured to receive the first signal having a first frequency and a second signal having a second frequency; receiving the second signal using the GNSS reception circuit; receiving at least one third signal using a wireless communication circuit configured to support cellular communication and/or short-range communication; determining existence of a multi-path state, based at least on the first signal and the second signal; and selecting at least one of the first signal, the second signal, or the third signal in order to determine the location of the electronic device, based at least on the determination.

The first signal and the second signal are received from the same satellite via different frequency bands, and the chip rate of the first signal and the chip rate of the second signal are different from each other.

Each of the first signal and the second signal includes an original signal transmitted from a GNSS device (e.g., a GNSS satellite) and a reflected signal corresponding to a reflection of the transmitted signal.

The step of determining the existence of the multi-path state further includes obtaining a vector of the first signal and a vector of the second signal over time, based on original signals and reflected signals; and determining multi-path states of the first signal and the second signal, based on the distribution of the vector of the first signal and the distribution of the vector of the second signal shown over time.

The step of determining the multi-path state of at least one of the first signal and the second signal may further include determining that the first signal and the second signal are in the multi-path state if the waveform of the vector of the first signal includes a peak point and a point at which at least one slope varies, and the waveform of the vector of the second signal includes a plurality of different peak points.

The step of determining the multi-path state of at least one of the first signal and the second signal may further include determining that the first signal and the second signal are in the multi-path state if the waveform of the vector of the second signal includes a plurality of different peak points within a predetermined period of time.

The step of determining the multi-path state of at least one of the first signal and the second signal may further include determining whether the first signal and the second signal are in the multi-path state based at least on the time interval between the original signal and the reflected signal.

The step of selecting at least one of the first signal, the second signal, or the third signal may further include selecting the first signal if it is determined that the first signal and the second signal are not in the multi-path state; and selecting the first signal and the second signal, or selecting the third signal if it is determined that the first signal and the second signal are in the multi-path state.

The method may further include determining a reception environment where the first signal and the second signal are received, based at least on the multi-path state.

Additionally, the structure of data used in the above-described embodiments may be recorded in a computer readable recording medium via various means. The computer readable recording medium may include a storage medium such as a magnetic storage medium (e.g., a ROM, a floppy disk, or a hard disk) and an optical reading medium (e.g., a CD-ROM or a digital versatile disc (DVD)).

The computer readable recording medium may record a program for enabling the electronic device 101 to perform an operation of receiving a first signal using the GNSS reception circuit 220 configured to receive the first signal having a first frequency and a second signal having a second frequency; an operation of receiving the second signal using the GNSS reception circuit 220; an operation of receiving at least one third signal using the wireless communication circuit 230 configured to support cellular communication and/or short-range communication; an operation of determining whether a multi-path state exists based at least on the first signal and the second signal; and an operation of selecting at least one of the first signal, the second signal, or the third signal in order to determine the location of the electronic device, based at least on the determination.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a global navigation satellite system (GNSS) reception circuit including a first antenna and a second antenna, wherein the first antenna is configured to receive a first signal in a first frequency band, and the second antenna is configured to receive a second signal in a second frequency band which is lower than the first frequency band, wherein the first frequency band and the second frequency band do not overlap;
a wireless communication circuit configured to support cellular communication or short-range communication;
a processor operably connected to the GNSS reception circuit and the wireless communication circuit; and
a memory operably connected to the processor,
wherein the memory stores instructions that enable the processor to perform operations when the instructions are executed, the operations comprising:
receive, from a satellite, the first signal using the first antenna;
receive, from the satellite, the second signal using the second antenna;
receive a third signal using the wireless communication circuit;
obtain a first vector of the first signal and a second vector of the second signal, by correlating each of the first signal and the second signal;
identify a degree of a multi-path state based on the first vector and the second vector;
determine a reception environment based at least on the degree of the multi-path state, wherein the reception environment comprises a first environment, a second environment, and a third environment that correspond to different densities of structures around the electronic device;
when the reception environment is the first environment, select the first signal to determine a location of the electronic device;
when the reception environment is the second environment, select the first signal and the second signal to determine the location of the electronic device; and
when the reception environment is the third environment, select the third signal to determine the location of the electronic device,
wherein the degree of the multi-path state is identified based on a waveform of the first vector comprising a peak point and a point at which at least one slope varies, or based on a waveform of the second vector comprising a plurality of different peak points within a predetermined period of time.

2. The electronic device of claim 1, wherein the first signal and the second signal are received from the same satellite via different frequency bands; and
a chip rate of the first signal and a chip rate of the second signal are different from each other.

3. The electronic device of claim 1, wherein each of the first signal and the second signal comprises an original signal transmitted from a GNSS device and a reflected signal which corresponds to a reflection of the transmitted signal, and
wherein the instructions further enable the processor to:
determine the degree of the multi-path state based at least on time intervals between the original signal and the reflected signal of the each of the first signal and the second signal.

4. The electronic device of claim 1, wherein the first environment corresponds to a low level density, the second environment corresponds to a middle level density, and the third environment corresponds to a high level density.

5. The electronic device of claim 4, wherein the instructions further enable the processor to:
store information associated with the determined reception environment in the memory, or store the same in an external server using the wireless communication circuit.

6. A method comprising:
receiving, from a satellite, a first signal using a first antenna configured to receive the first signal in a first frequency band;
receiving, from the satellite, a second signal using a second antenna configured to receive the second signal in a second frequency band which is lower than the first frequency band, wherein the first frequency band and the second frequency band do not overlap;
receiving a third signal using a wireless communication circuit configured to support cellular communication or short-range communication;
obtaining a first vector of the first signal and a second vector of the second signal, by correlating each of the first signal and the second signal;
identifying a degree of a multi-path state, based on the first vector and the second vector;
determining a reception environment based at least on the degree of the multi-path state, wherein the reception environment comprises a first environment, a second environment, and a third environment that correspond to different densities of structures around the electronic device;
when the reception environment is the first environment, selecting the first signal to determine a location of the electronic device;
when the reception environment is the second environment, selecting the first signal and the second signal to determine the location of the electronic device; and
when the reception environment is the third environment, selecting the third signal to determine the location of the electronic device,
wherein identifying the degree of multi-path state exists comprises:
identifying the degree of the multi-path state based on a waveform of the first vector comprising a peak point and a point at which at least one slope varies, and
identifying the degree of the multi-path state based on a waveform of the second vector comprising a plurality of different peak points within a predetermined period of time.

7. The method of claim 6, wherein the first signal and the second signal are received from the same satellite via different frequency bands, and a chip rate of the first signal and a chip rate of the second signal are different from each other.

8. The method of claim 6, wherein the first environment corresponds to a low level density, the second environment corresponds to a middle level density, and the third environment corresponds to a high level density.

* * * * *